(12) United States Patent
Manzardo

(10) Patent No.: US 7,506,018 B2
(45) Date of Patent: Mar. 17, 2009

(54) METHODS AND APPARATUS FOR DETERMINING ONE OR MORE ACCESS POINTS IN A COMMUNICATION SYSTEM

(75) Inventor: Marcel Manzardo, Los Gatos, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 587 days.

(21) Appl. No.: 10/377,446

(22) Filed: Feb. 28, 2003

(65) Prior Publication Data

US 2004/0177137 A1    Sep. 9, 2004

(51) Int. Cl.
*G06F 15/16* (2006.01)
(52) U.S. Cl. .................. 709/200; 709/217; 709/225; 370/228; 370/238
(58) Field of Classification Search .......... 709/200, 709/217–219, 225, 229; 370/328, 338
See application file for complete search history.

(56) References Cited

U.S. PATENT DOCUMENTS

| 5,270,919 | A | 12/1993 | Blake et al. | |
|---|---|---|---|---|
| 5,703,938 | A | 12/1997 | Lucas et al. | |
| 5,787,271 | A | 7/1998 | Box et al. | |
| 5,933,416 | A | 8/1999 | Schenkel et al. | |
| 6,012,088 | A | 1/2000 | Li et al. | |
| 6,041,044 | A | 3/2000 | Sciffert et al. | |
| 6,209,033 | B1 | 3/2001 | Datta et al. | |
| 6,282,267 | B1 | 8/2001 | Nolting | |
| 6,452,324 | B1* | 9/2002 | Soules et al. | 313/486 |
| 6,567,514 | B2* | 5/2003 | Fleischer et al. | 379/221.03 |
| 6,920,319 | B2* | 7/2005 | Knutsson et al. | 455/422.1 |
| 6,963,828 | B1* | 11/2005 | McDonald et al. | 703/22 |
| 2002/0188723 | A1* | 12/2002 | Choi et al. | 709/225 |

* cited by examiner

*Primary Examiner*—Ario Etienne
*Assistant Examiner*—El Hadji M Sall

(57) ABSTRACT

Embodiments of the present invention provide a system, method, apparatus, means, and computer program code for designing a communication system. According to embodiments of the present invention, the communication system may include a number of locations, each of which has a known or expected number of users but an unknown number of needed access points. Each access point in the communication system may be treated as an individual switch with a limited number of connections (e.g., line connections, gateway channels), even though the number of required access points per location is unknown and the number of users per access point is unknown. As part of the design or determination process, inventory information for one or more locations may be determined. The traffic to and from an access point at the location may depend on the inventory information, which can be used to determine the number of access points needed for the location.

14 Claims, 10 Drawing Sheets

FIG. 7

| Location 404 | Switch Type 406 | | Calculate 430 | | | | | | | | | | | | | | Mode 402 |
|---|---|---|---|---|---|---|---|---|---|---|---|---|---|---|---|---|---|
| 1 | 4500 | | | | | | | | | | | | | | | | Expert |

SYSTEM PARAMETERS 600

TRUNKING PARAMETERS 604

| 602 | Blocking % | % In Tr Call 412 | % Out Tr Call | Phantom Lines 606 | CCS optiSet 608 | CCS IP | CCS Call Center 610 | CCS Voice Mail 612 / 614 616 |
|---|---|---|---|---|---|---|---|---|
| | 1.0% | 50% | 50% | 10% | 6.0 | 6.0 | 32 | 0.6 |

IP PHONE PARAMETERS 624

| Encoding IP LAN 618 | Sampling Time LAN 620 | Jitter Buffer IP 622 | Encoding IP WAN | Sampling Time WAN 626 | Jitter Buffer IP 628 |
|---|---|---|---|---|---|
| G.711 | 30ms | 50ms | G.711 | 30ms | 50ms |

LINE PARAMETERS 416

| | Digital Lines 410 | Analog Lines | LAN IP Lines 414 | WAN IP Lines | Phone Adapt. 510 | Call Center Agents 512 | Agent Type 514 | ACD Over Trunking 516 |
|---|---|---|---|---|---|---|---|---|
| Plan For | 240 | 120 | 0 | 0 | 0 | 0 | DIG | 20% |
| Equipped | 100 | 80 | 0 | 0 | 0 | 0 | | |

TRUNKING PARAMETERS 418

| | %IT 630 | %OT | Trunking Type 632 | Local Trunking 420 | AP Type | IP Params 634 | Sampling Time |
|---|---|---|---|---|---|---|---|---|
| Location 1 | 100% | 100% | PRI | NO | 3500 | G.711 | 30ms |
| Equipped | | | | | | | | |

AP PARAMETERS 422 636

EVALUATION OUTPUT

| | # 3300 APs 450 | # AP I/F (HG 3750) 452 | Trunk Type 1 454 / 456 |||| Trunk Type 2 650 / 652 ||||
|---|---|---|---|---|---|---|---|---|---|---|
| | | | #IT Chan. | #OT Chan. | # Dig. Cards | # Anal. Cards | # IP Cds | #IT Chan. | #OT Chan. | Surv. Only? |
| Main Switch | 2 | 1 | 31 | 31 | 10 | 5 | 0 | - | - | - |

| | # 3300/ 3500 470 | # of AP 3505 472 | #IT Chan. 474 | #OT Chan. 476 | # Dig. Cards 530 | # Anal. Cards 532 | # IP Cds 534 | #IT Chan. 670 | #OT Chan. 672 | Surv. Only? 674 |
|---|---|---|---|---|---|---|---|---|---|---|
| Access Point | 1 | 1 | 15 | 15 | 5 | 2 | 0 | - | - | - |

| | LAN BW 458 | WAN BW 460 | IP-IP LAN Del. 658 | IP-IP LAN O/H 660 | IP-IP WAN Del. 662 | IP-IP WAN O/H 664 |
|---|---|---|---|---|---|---|
| Main Switch | 1.1 | 1.1 | 280ms | 29% | 280ms | 29% |

| | LAN BW 478 | WAN BW 480 | Host-AP Delay 678 | AP IP O/H 680 | Voice BW / Conn. 682 |
|---|---|---|---|---|---|
| Location 1 | 1.1 | 1.1 | 140 | 29% | 82.7 |

FIG. 8

METHODS AND APPARATUS FOR DETERMINING ONE OR MORE ACCESS POINTS IN A COMMUNICATION SYSTEM

BACKGROUND OF THE INVENTION

The present invention relates to a method and apparatus for determining one or more access points in a communication system.

A traditional distributed communication system may include several locations, each of which includes one or more individual networked switches or access points. The access points at a location may be in communication with each other via a local area network (LAN) or other communications network. The communication networks at each location may be in communication with a main switch or host via a wide area network (WAN) or other communication network. Thus, each access point at a location can communicate with the main switch via the LAN at the location and the WAN connecting the WAN and the main switch.

Each access point at a location may support one or more users (e.g., telephones, computers, facsimile machines). Such users may be connected to an access point via digital or analog lines or connections. In addition, some users may be connected to the access point via an IP (Internet protocol) LAN or IP WAN. The access point may support a fixed number of cards, each of which may support digital lines, analog lines, or IP lines. In addition, an access point may have one or more local trunks lines that provide access or connection to one or more telephone networks. In addition, the main switch may support a number of central trunks that provide access or connection to the telephone network(s).

In some situations, a distributed system may consist of a number of locations, each location needing one or more individual access points that have a fixed or maximum number of network interface resources. That is, an access point may be able to support a fixed or maximum number of digital, analog, and/or IP lines and/or a fixed or maximum number of local trunk lines. However, when designing a distributed communication system, the total number of access points needed for each location may not be known and the number of users that can be supported by each access point at the different locations also may not be known.

It would be advantageous to provide a method and apparatus that facilitated the design, determination or analysis of one or more access points for a communication system, including individual access points having fixed numbers of resources in a distributed communication system.

SUMMARY OF THE INVENTION

Embodiments of the present invention provide a system, method, apparatus, means, and computer program code for determining one or more access points needed for one or more locations in a distributed communication system. According to embodiments of the present invention, each access point in the system may be treated as an individual switch with a limited number of connections (e.g., resources), even though the number of required access points per location is unknown and the number of users per access point is unknown. The distributed communication system may include a number of locations, each of which has a known or expected number of users. As part of the process inventory information for one or more locations may be determined. The traffic to and from an access point at the location may depend on the inventory information. Inventory information may include information regarding a number of users at the location; types of users at the location; voice mail needs for users, community of interest factors, trunking needs, etc. One or more access points for a location can be configured or otherwise determined from the inventory information. The number of access points for a location and a specific user type can be determined by dividing the number of users per location by the number of users per access point previously determined. In some embodiments, an access point may support more than one type of user. As a result, the number of access points at each location can be determined and the configuration of each access point at each location can be determined. Once a configuration or design is determined, information regarding the configuration or design of the location and/or the entire distributed system can be provided. In addition, bandwidth information for communications networks connecting access points within a location and for communication network connecting a main switch to each location also can be determined.

Additional objects, advantages, and novel features of the invention shall be set forth in part in the description that follows, and in part will become apparent to those skilled in the art upon examination of the following or may be learned by the practice of the invention.

According to some embodiments of the present invention, a method for determining the number of users for an access point may include (a) determining inventory information for a location having a known number of users; (b) establishing a number of users for an access point for the location to an initial value, wherein the initial value does not exceed the maximum number of users supportable by the access point; (c) determining a number of channels required for the access point based on the number of users and the inventory information; and (d) changing the number of users for the access point and repeating (c) until such time as a highest number of users is established for the access point while the access point's channel capacity is not exceeded.

In some embodiments determining a number of channels may include determining on or more traffic parameters for an access point, user, user type, and/or location. A traffic parameter may be or include traffic from the access point to other locations; traffic to the access point from other locations; traffic from the access point to other access points in the location; traffic to the access point from other access points in the location; trunk traffic into a local communication network; a community of interest factor for the location; a community of interest factor for other locations; voice mail needs for one or more locations; etc. In some embodiments, the method may be implemented by a system, computer code, or other means. The system, computer code, or other means may provide an interface that allows a user to provide data indicative of inventory information for one or more locations. In addition, the system, computer code, or other means may determine and provide or display information regarding how many access points are needed for a location and their configuration.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 7 is a diagram of another representative interface that may be used in conjunction with some embodiments of the present invention;

FIG. 8 is a diagram of another representative interface that may be used in conjunction with some embodiments of the present invention;

DETAILED DESCRIPTION OF SPECIFIC EMBODIMENTS

Applicant has recognized that there is a market opportunity for systems, methods, apparatus, means, computer code, and methods that allow one or more access points for one or more locations in a distributed system to be designed or otherwise determined, wherein the distributed system includes a number of locations, each having a known or expected number of users. Each location may need one or more access points, wherein each access point in the system is treated as an individual switch with a limited number of connections (e.g., resources), even though the number of required access points per location is unknown and the number of users per access point is unknown.

As part of the designed process inventory information for one or more locations may be determined. The traffic to and from an access point at a location may depend on the inventory information. An iterative approach may be taken to determine the number of users that can be supported by a single access point for the location given the inventory information. The number of access points for a location can be determined by dividing the number of users per location by the number of users per access point previously determined. Each location may be designed or configured in a similar manner. Once a configuration or design is determined, information regarding the configuration or design of the location and/or the entire distributed system is provided. Providing information may include displaying the information on a monitor, generating a report or file that includes the information, storing the information in a database, transmitting the information to another party or device, providing a graphic display of the configured system, etc. These and other features will be discussed in further detail below, by describing a system, individual devices, and processes according to embodiments of the invention.

Figure 1:
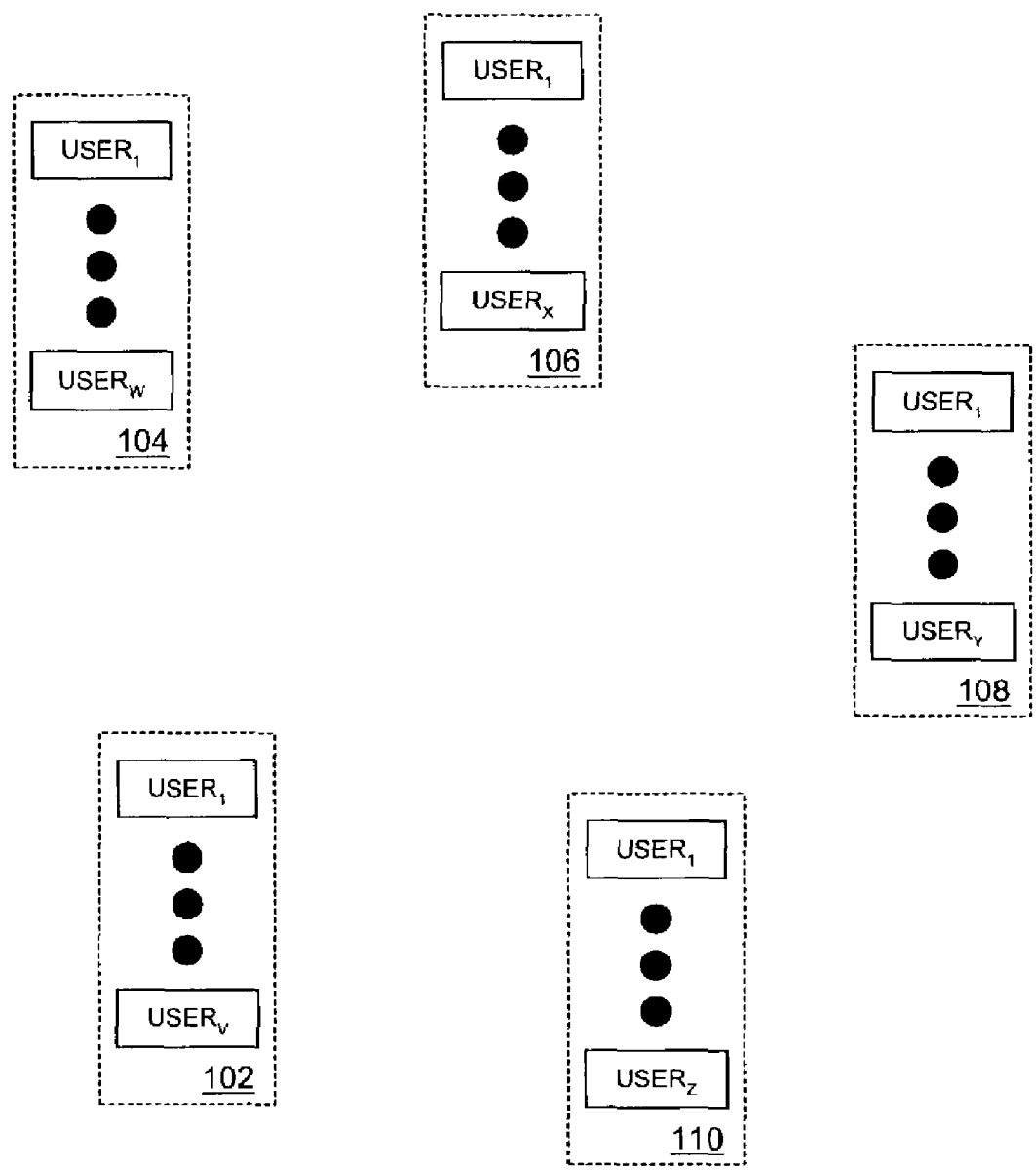
FIG. 1 is a block diagram illustrating a fixed number of users at multiple locations for which a distributed communication system might be needed.

Now referring to FIG. 1, a representative example of a number of locations 102, 104, 106, 108, and 110 is illustrated, each location having a known or planned for number of users to be supported. For example, location 102 may have a V number of users, location 104 may have a W number of users, location 106 may have an X number of users, etc.

Figure 2:
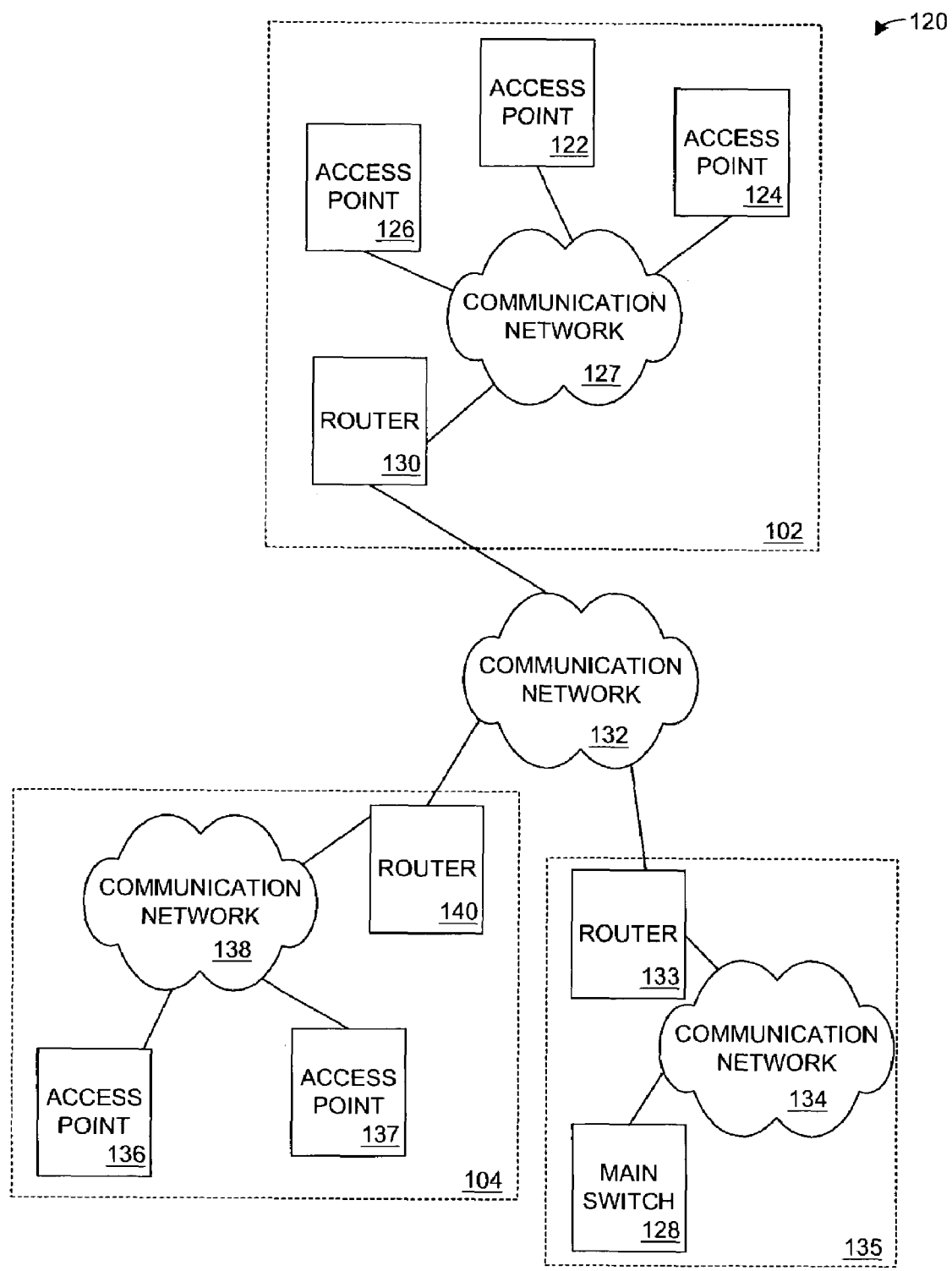
FIG. 2 is a block diagram illustrating an access point and main switch connected via a communication network for one of the locations illustrated in FIG. 1.

Using the methods of the present invention, the number of access points needed for the locations 102, 104, 106, 108, 110 may be determined. For example, now referring to FIG. 2, a distributed system 120 is illustrated. The location 102 may need one or more access points 122, 124, 126 that may communicate with each other via communications network 127 and to a main switch (also referred to as a host) 128 via a router 130, another communications network 132 (typically a wide area network, a router 133, and a communications network 134. Typically, the networks 127 and 134 will be or include a local area network (LAN) and the network 132 will be or include a wide area network (WAN). The main switch 128, the router 133, and the communication network 134 may be at a location 135 which is different from the locations 102, 104.

Similarly, the location 104 may need two access points 136, 137 that may communicate with each other via a communication network 138 and to the main switch 128 via the router 140 and the communication network 132. Like the network 127, the network 138 may be or include a local area network.

Each of the access points 122, 124, 126, 134, 136 may support a number of users via digital, analog, and/or IP lines (which might be LAN or WAN lines or connections). For example, a user may be an IP enabled telephone connected to or in communication with the access point 122 via an IP LAN (e.g., the network 127) or an IP WAN (e.g., the network 132). In addition, one or more of the access points 122, 124, 126, 136, 137 may include one or more localized trunks connected to a telephone or other communication network.

The main switch 128 also may include one or more central trunks to the telephone or other communication network and digital, analog, or IP lines for supporting one or more users. In addition to digital and analog lines, users may be connected to or in communication with the main switch 128 via IP LANs (e.g., the network 134) and IP WANs (e.g., the network 132). For example, a user may be an IP enabled telephone connected to the main switch 128 via an IP LAN or an IP WAN.

Figure 3:
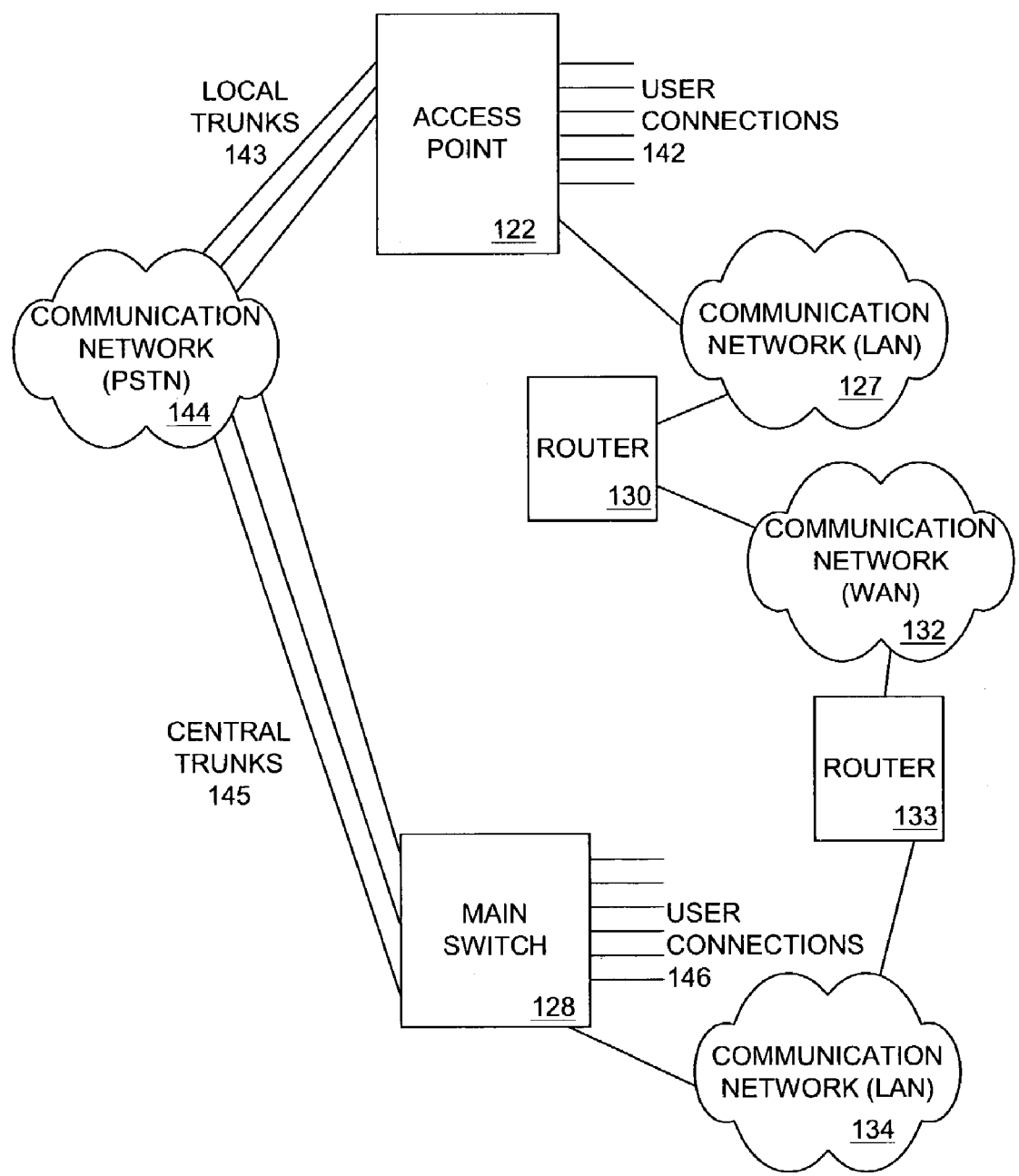
FIG. 3 is another block diagram illustrating multiple access points and the main switch for one of the locations illustrated in FIG. 1.

For example, now referring to FIG. 3 and focusing on the access point 122 and the main switch 128, the access point 122 may include user connections 142 which may be analog, digital, and/or IP (LAN and WAN) users. IP LAN type users for the access point 122 also may be connected to or part of the network 127 and IP WAN type users for the access point 122 may be connected to or part of the network 132. In addition, the access point 142 may include one or more local trunks 143 that allow the access point 122 to bypass the main switch 128 and be connected to a communication network 144, which may be or include a telephone network (e.g., a public switched telephone network (PSTN)). In additional the main switch 128 may include central trunks 145 that connect the main switch 128 to the communication network 144. The main switch 128 also may support one or more analog, digital, and/or IP (LAN and WAN) users directly via user connections or lines 146, the network 134, and/or the network 132. The communication network 144 may be or include a central office (CO) for purposes of handling calls to and from the access point 122 via trunks 143 and calls to and from the main switch 128 via the trunks 145. Thus, the local trunks 143 also may be referred to as local CO trunks and the central trunks 145 also may be referred to as central CO trunks.

Figure 4:
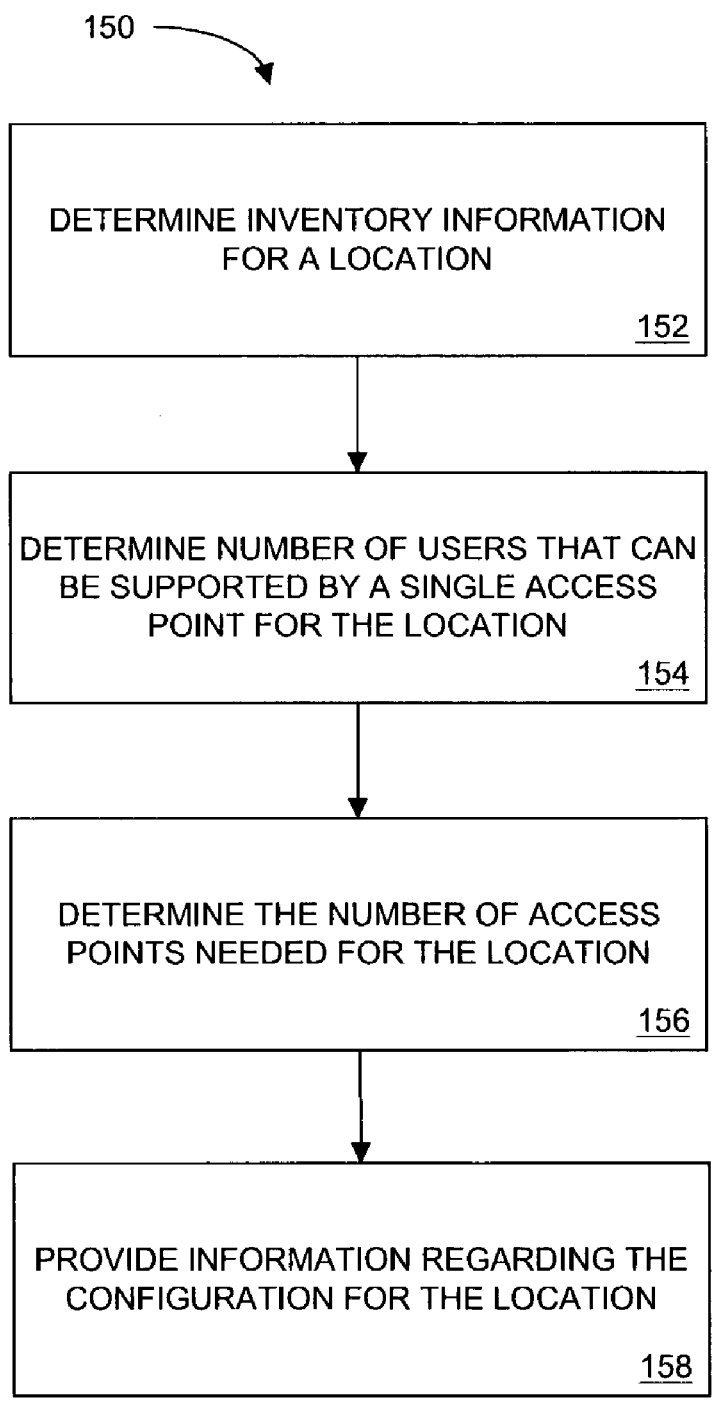
FIG. 4 is a flowchart of a first embodiment of a method in accordance with the present invention.

Reference is now made to FIG. 4, where a flow chart 150 is shown which represents the operation of a first embodiment of the present invention. The particular arrangement of elements in the flow chart 150 is not meant to imply a fixed order to the steps; embodiments of the present invention can be practiced in any order that is practicable. The method 150 allows a distributed system to be designed or otherwise determined, wherein each access point in the system is treated as an individual switch with a limited number of connections, even though the number of required access points per location is unknown and the number of users per access point is unknown. The distributed system may include a number of locations, each of which has a known or expected number of users. Traffic at or between locations may be measured in erlangs, where one erlang is equal to one full hour of use (e.g., conversation). One erlang is the equivalent of one call (including call attempts and holding time) in a specific channel for 3600 seconds in an hour. The 3600 seconds need not be, and generally are not, in a contiguous block. The hundred or centum call second or CCS is the equivalent of one call for one hundred seconds out of an hour. Thus, a traffic density of one CCS is equal to $\frac{1}{36}$ erlang. An erlang can be applied to the group of lines in a telephone trunk line or to the traffic in a telephone call center.

Processing begins at a step 152 during which inventory information for one or more locations is determined or identified. The traffic to and from an access point in a location may depend on the inventory information. Inventory information for a location may include, but is not limited to:

The number of users (which may include one or more users to be planned for) at the location;
The type of users at the location;
The number of other locations;
The number of users at the other locations;
The types of users at the other locations;
The average amount of traffic for the location;
The average amount of traffic for other locations;
The community of interest (COI) factor for the location;
The community of interest (COI) factors for the other locations;
The typical behavior of users at the location;
The typical behavior of users at other locations;
Voice mail use (e.g., the type of voice mail applications and whether the voice mail is handled locally on an access point and/or centrally on a main switch);
Local trunking needs for the location; and
Central trunking needs for the location.

The community of interest (COI) factor for a location is formed by the users at the location that determine the call patterns for the location. Thus, the community of interest for a location can influence the connections and bandwidth needed for the location, which in turn can affect the overall system design and architecture. A community of interest factor of zero percent for a location implies that all calls generated by users at this location stay within the location. For example, consider a main office and a branch office for a bank. The branch office may be completely independent of the main office and users at the branch office may seldom call somebody at the main office, and vice versa. In this scenario each location has a low community of interest factor (almost zero percent) that reduces the number of required connections into the network considerably.

A community of interest factor of one hundred percent for the location implies that the calls generated by users at the location are distributed homogeneously to other locations and are not weighted by location. For example, assuming users are distributed in two buildings in a campus environment, one being served by a main switch and the other by access points.

In this environment there is no community of interest. The probabilities that a user calls the main site or anybody on the distributed location are the same (assuming the same number of users at each location). The calls are distributed homogenously and the community of interest factor is one hundred percent. In this environment much higher network traffic is going to be generated than in the previous example and less users per access point can be supported.

With regard to voice mail traffic and use, information regarding the amount of messages per user can be provided or determined during the step 152. In some embodiments, voice mail traffic can impact the traffic and bandwidth requirements on a network connecting access points at a location (e.g., the network 127) and/or traffic on a network connecting the location network and the main switch 128 (e.g., the network 132). In many situations, two messages per user per hour at thirty seconds each is a conservative assumption that can be used for the voice mail traffic or erlang value for the voice mail traffic.

For purposes of analyzing voice mail traffic, a distinction may be made between local trunking and centralized trunking, centralized versus local voicemail, as well as trunk versus station to station calls. A station to station call is a directly dialed call where no operator is used to complete or make the call. Outgoing trunk calls from an access point (e.g., the access point 122) will not generate any voicemail traffic on a local network (e.g., the network 127) because such trunk calls are directed from the access point to the central office network (e.g., the network 144). An incoming DID (Direct Inward Dialing) trunk call to an access point however can generate additional voicemail traffic on an access point in case a user on the access point does not pick up the telephone or otherwise answer the call. If the DID trunk call is local (i.e., the trunk call comes in to the access point) and the voicemail is at the main switch 128, additional traffic is generated on the local area network for the access point (e.g., the network 127) as well as the wide area network (e.g., the network 132). The additional voicemail traffic requires resources on the access point where the incoming DID call arrived and thus affects the number of users that can be supported. If the DID trunk call is at the main switch 128 (i.e., the trunk call comes into the main switch 128), no additional voicemail traffic is generated on the access points because trombone connections are eliminated.

The following is an example of a trombone connection: an incoming call on a DID trunk for the main switch 128 is directed to a user on an access point 122. The user does not pick up and the call is redirected from the access point 122 to a centralized voicemail application operating on or at the main switch 128. The original connection from the DID trunk to the access point 122 is not required anymore once the connection from the DID trunk to the voicemail application at the main switch 128 is established. In case this connection stays up it is considered a trombone connection. Such trombone connections are eliminated in the HiPath 4000 system and thus, no additional voicemail traffic is generated for users on access points with centralized trunking and centralized voicemail. Station to station calls can generate additional voicemail traffic in case the voicemail system is located at the main switch 128. In case of a local voicemail system, no additional traffic is generated on the access points.

TABLE 1

| TRUNK LOCATION | VOICE MAIL APPLICATION LOCATION | CALL TYPE | INCREMENTAL VOICE MAIL TRAFFIC |
|---|---|---|---|
| X | X | Outgoing trunk call from access point | None |
| Main switch 128 | X | Incoming trunk call to access point | None |
| Access point | Main switch 128 | Incoming trunk call from access point | Yes, on network connecting access point to main switch 128 (e.g., the network 132) |
| Access point | Access point | Incoming trunk call to access point | Yes on network where voice mail interface cards are located in case incoming call arrives on trunk that is located on a different access point than the voice interface card |
| X | Main switch 128 | Station to Station call from any user in the system to any other user in the system | Yes, on network connecting access point to main switch 128 (e.g., the network 132) |
| X | Access point | Station to Station call from in the system to any other user in system | None |

In general, when additional traffic is generated to or from an access point due to voicemail messages, resources are used on that access point which in turn affects the number or users that can be supported on that access point.

During a step 154, a number of users that can be supported by a single access point for the location is determined. As will be discussed in more detail below, an iterative approach may be taken to determine the number of users that can be supported by a single access point for the location given the inventory information determined during the step 152. In some embodiments, a number of users for an access point might be determined by type. For example, the number of digital users that an access point can support may be determined. In other embodiments, the users for an access point might be mixed such that the access point supports two or more types of users.

During a step 156, a number of access points needed for the location are determined. If all of the users at a specific location are the same type, the number of access points for a location can be determined by dividing the number of users per location by the number of users per access point determined during the step 154. In other embodiments, if the users at a specific location are comprise two or more types, the number of users per access point may be determined for each user type. That is, an access point for each user type may be determined. The total number of access points can be determined by adding up the number of access points for each user type. Leftover users (if they exist) from a first type may be incorporated for the traffic calculation of the first access point for the second user type, thereby generating an access point having mixed types.

Any information needed during the step 156 may be assumed, determined during the step 152 as part of the inventory information, and/or determined or calculated from information assumed or determined during the step 152.

During a step 158, information regarding the configuration or design of the location and/or the entire distributed system is provided. In some embodiments of the method 150, the step 158 may be optional and not used. Providing information may include displaying the information on a monitor, generating a report or file that includes the information, storing the information in a database, transmitting the information to another party or device, displaying or providing a graphic representation of the system, etc.

Figure 5:
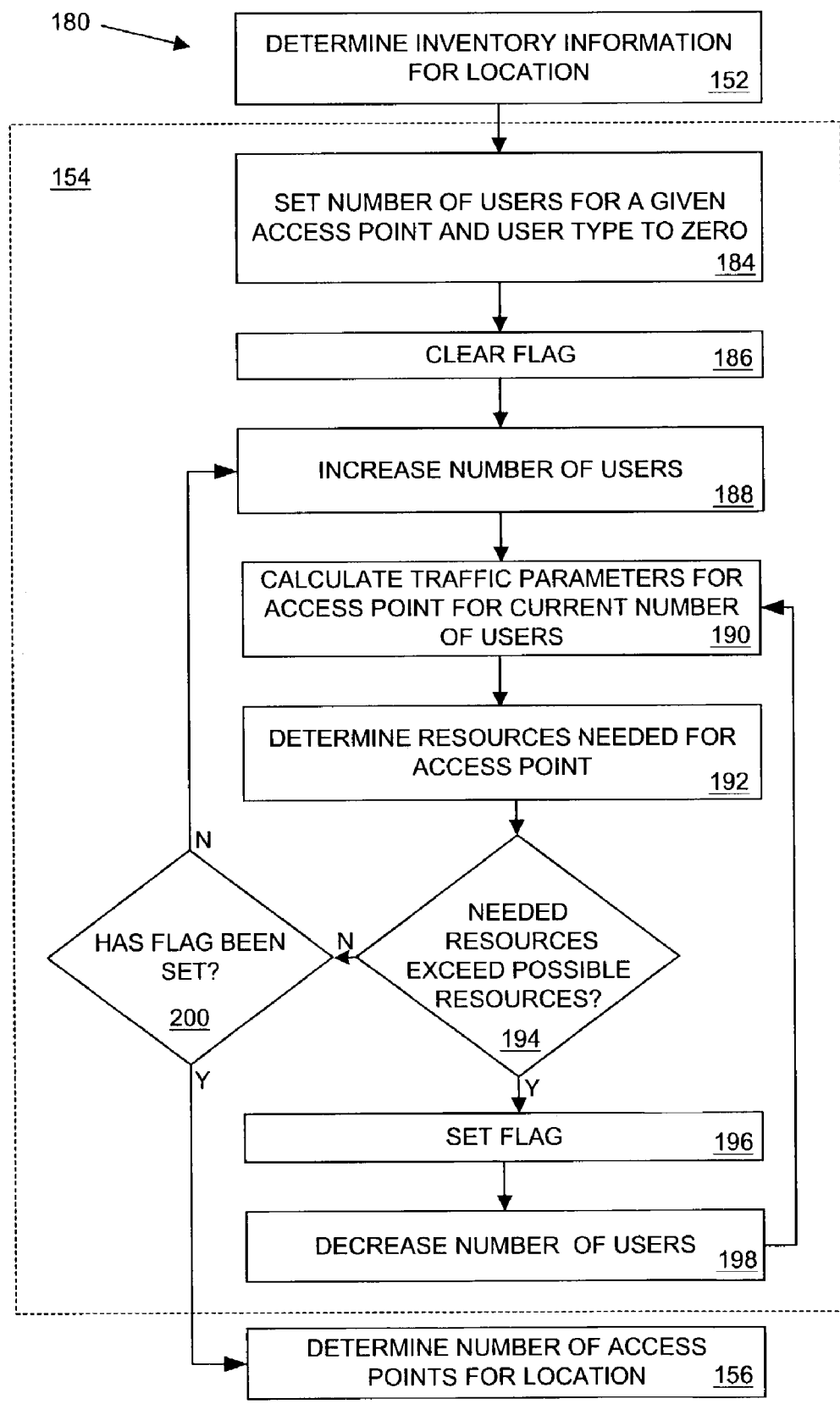
FIG. 5 is a flowchart of a second embodiment of a method in accordance with the present invention.

Reference is now made to FIG. 5, where a flow chart 180 is shown that represents the operation of a second embodiment of the present invention, with particular emphasis on the step 154 of the method 150. The method 180 includes the steps 152 and 154 previously discussed above. The step 154 includes the steps 184, 186, 188, 190, 192, 192, 194, 196, 198, and 200. The step 154 determines the number of users per access point in a location that can be supported in a given network configuration taking the entire topology and connection restrictions into account. Connection restrictions include the maximum number of cards that an access point can have, the maximum number of lines that each card type can support, etc. In general, the step 154 assumes that the any network topology can be split up into a given number of users on a specific access point and the rest of the network. Traffic parameters can define the traffic for a specific access point and a given number of users for the access point.

During the step 184, the starting number of users for a given access point and user type in a location is set to zero. As previously discussed above, a user type refers to whether the user is using an analog, digital, or IP line.

During the step 186, a flag is cleared. The flag will be used to determine when the iterative aspects of the step 154 should end.

During a step 188, the number of users for the access point is increased. In some embodiments, the number of users for the access point may be incremented by a fixed amount. For example, the access point may use analog and/or digital line cards for connections to analog and/or digital type users. Each card may support a fixed number of users. When increasing the number of users during the step 188, the increment may be equal to the number of users supported on a line card for a specific user type. As a more specific example, when the user type is digital, the step 188 may increment the number of digital users by twenty-four since (for purposes of this example) a digital card may support either up to twenty-four digital users. As another example, when the user type is analog, the step 188 may increment the number of analog users by twenty-four since (for purposes of this example) a single analog card may support up to twenty-four analog users. When the user type is IP, the step 188 may increment the number of users by thirty. In different iterations of the step 188, different types of users may be added. Thus, different numbers of users may be added on successive iterations of the step 188. However, the step 188 may not increment the number of users such that the number of users exceeds the maximum number of users that may be supported by a type of access point being used. For example, a Model 3300 access point or Model 3500 access point, both provided by the Siemens Corporation, may be used in the method 150. The Model 3300 access point includes sixteen slots for cards while the Model 3500 access point includes three slots for cards. Model 3505 extenders, each of which supports up to four cards, can be added to the Model 3500 access point. A card may be used to support different numbers of users, depending on the type of card (e.g., digital, analog, IP).

In some embodiments, the number of uses for the access point may be increased by a specific user type. That is, only users of one type might be added to the access point. Thus, the access point being determined might be used to support only one type of user. In other embodiments, multiple user types may be supported by a single access point. Thus, traffic values or parameters for the different user types may need to be calculated by user type and combined together to get values for the "mixed" access point. Alternatively, averages can be used that take the different types of users into account, During a step 190, traffic parameters are calculated or otherwise determined for the access point based on the number of users established by the step 188, the inventory information determined during the step 152, and other assumptions if needed. Traffic parameters that may be used during the step 190 include the following:

1. Traffic from the access point to all other locations ($E_{snjtot}$);
2. Traffic to the access point from all other locations ($E_{sjntot}$);
3. Traffic from the access point to other access points at the location ($E_{skjtot}$);
4. Traffic to the access point from other access points at the location ($E_{sjktot}$);
5. Trunk traffic into the local communication network ($E_{st}$);
6. Voice mail traffic and use; and
6. Community of interest factors for each location ($coi_j$).

General Equations As a starting point, the following two general equations are used:

(1) $$\rho_j = \frac{1}{U_{tot} - 1}$$

$\rho_j$ = Probability that a single user in a system is called by another user in the system when community of interest factors are ignored and a homogenous traffic distribution is assumed.
$U_{tot}$ = Total number of users in the system.

-continued (2) $$E_{sj} = \rho_j P_{ot} P_{st} E_{avg}$$

$E_{sj}$ = Erlangs generated to a single user in the system from a single average user in the system.
$P_{ot}$ = Percentage outgoing traffic generated by a user at a location relative to both incoming and outgoing traffic for the user. Typically fifty percent can be used as a good estimate if the exact number is not known since a user typically will receive the same number of calls as the user makes.
$P_{st}$ = Percentage station traffic (typically thirty-two percent can be used as a good estimate if the exact number is not known), which can be defined as the portion of overall traffic that includes user to user calls. Trunk traffic is the portion of the overall traffic that includes user to trunk calls. Station traffic plus trunk traffic equals total traffic.
$E_{avg}$ = Average erlangs per user in the system taking into account all of the user types in the system.

where the variables or factors $\rho_j$, $P_{st}$, $P_{ot}$, $U_{tot}$, $E_{avg}$ are part of the inventory information assumed, calculated or otherwise determined during the step 152 and community of interest factors are ignored (i.e., a homogenous traffic distribution is assumed). Trunk percentages for a specific system often are dependent on the system, the types of applications operating in the system, the calling patterns of users in the system, etc. and may be included in the inventory information determined during the step 152. In some embodiments of the method 180, community of interest factors may be ignored and a homogenous traffic distribution assumed. The average erlangs per user in the system ($E_{avg}$) may be part of the inventory information determined during the step 152. Alternatively, the average erlangs per user in the system ($E_{avg}$) may be determined or calculated by multiplying the number of users of each type in the system with their respective erlang values, summing up the resulting total erlang values per user type, and dividing the result by the total number of users, or assumed to be a user provided number.

Traffic From Access Point to Other Locations ($E_{snjtot}$)

The following equations determine the erlangs that are generated from a single access point at a given location n having a given number of users $u_k$ to all the other locations j.

(3) $$E_{nj} = \rho_{nj} E_n$$

$E_{nj}$ = erlangs generated by users at location n, directed to location j.
$\rho_{nj}$ = Probability that a user at a given location j is called by a user from location n.
$E_n$ = Total erlangs generated at location n.

(5) $$E_n = U_n P_{ot} P_{st} E_{navg}$$

$U_n$ = Total number of users at location n.
$P_{ot}$ = Percentage outgoing traffic (typically fifty percent can be used as a good estimate if the exact number is not known).
$P_{st}$ = Percentage station traffic (typically twenty-three percent can be used as a good estimate if the exact number is not known).
$E_{navg}$ = Average erlangs per user at location n (which may include regular and call center users as well as incoming and outgoing traffic).

(4) $$\rho_{nj} = U_j \frac{coi_n}{U_{tot} - 1}$$

$U_j$ = Total number of users at location j.
$coi_n$ = Community of interest factor at location n.
$U_{tot}$ = Total number of users in the system.

The average erlangs per user at location n ($E_{navg}$) may be part of the information received during the step 152. Alternatively, the average erlangs per user at location n ($E_{navg}$) may be determined by summing up the Erlangs of all users at location n and dividing the total by the total number of users at location n. The community of interest factor at location n for the location n ($coi_n$) may be part of the information determined during the step 152. Alternatively, the community of interest factor at location n for the location n ($coi_n$) may be determined by analyzing the call patterns of the actual users or assumed to be one hundred percent (which is the most conservative approach).

Using equations (3), (4) and (5) allows a determination of the erlangs $E_{nj}$ generated at location j by users at location n.

$$E_{nj} = U_j U_n P_{ot} P_{st} E_{navg} \frac{coi_n}{U_{tot} - 1} \quad (6)$$

In order to calculate the erlang traffic $E_{njtot}$ to all other locations $E_{nj}$ needs to be summed up over all existing locations except location n.

$$E_{njtot} = \sum_{\substack{j=1 \\ l \neq n}}^{l} \left( U_j U_n P_{ot} P_{st} E_{navg} \frac{coi_n}{U_{tot} - 1} \right) \quad (7)$$

$$= U_n P_{ot} P_{st} E_{navg} \frac{coi_n}{U_{tot} - 1} \sum_{\substack{j=1 \\ l \neq n}}^{l} U_j$$

The sum of all users at all other locations than n can be written as follows:

$$\sum_{\substack{j=1 \\ l \neq n}}^{l} U_j = U_{tot} - U_n \quad (8)$$

Using equations (7) and (8) allows determining the erlangs $E_{njtot}$ generated at location n to all of the other locations.

$$E_{njtot} = U_n P_{ot} P_{st} E_{navg} \frac{coi_n}{U_{tot} - 1} (U_{tot} - U_n) \quad (9)$$

Given the need to calculate a single access point at a time and increment the number of users $u_k$ in that access point until the connection limitation is exceeded, the erlangs $E_{snjtot}$ generated by a given number of users $u_k$ needs to be determined.

Multiplying equation (9) with $u_k$ divided by the total number of users at that location $U_n$ provides the required erlang value, as shown below:

$$E_{snjtot} = E_{njtot} \frac{u_k}{U_n} = u_k E_{navg} \frac{coi_n}{U_{tot} - 1} (U_{tot} - U_n) \quad (10)$$

The connections determined by this erlang value are one component that defines the number of gateway channels required on the access point (i.e., channels on the access point to the location network (e.g., the network 127 for the access point 122)).

Traffic to Access Point From Other Locations ($E_{sjntot}$)

The following calculations determine the erlangs that are generated from all the other locations j to a single access point at a given location n with a given number of users $u_k$.

(11) $\rho_{jn} = \frac{U_n}{U_{tot} - 1}$    $\rho_{jn}$ = Probability that a user at a location n is called by a user from location j.
$U_n$ = Total number of users at location n.
$U_{tot}$ = Total number of users in the system.

(12) $E_{jn} = \rho_{jn} \vec{E}_j$    $E_{nj}$ = Erlangs generated by users at location j, directed to location n.
$\vec{E}_j$ = Total erlangs generated at location j weighted by the COI factor of location j.

(13) $\vec{E}_j = E_j coi_j$    $E_j$ = Total erlangs generated at location j by all users at location j.
$coi_j$ = Community of interest factor at location j.

Using equations (12), (13) and (13) allows calculation of the erlangs $E_{jn}$ generated at location n by users at location j.

$$E_{jn} = \frac{U_n}{U_{tot} - 1} E_j coi_j \quad (14)$$

In order to calculate the erlang traffic $E_{jntot}$ from all other locations $E_{jn}$ needs to be summed up over all existing locations except location n.

$$E_{jntot} = \sum_{\substack{j=1 \\ l \neq n}}^{l} \left( \frac{U_n}{U_{tot} - 1} E_j coi_j \right) = \frac{U_n}{U_{tot} - 1} \sum_{\substack{j=1 \\ l \neq n}}^{l} E_j coi_j \quad (15)$$

The sum of all the total erlangs at each location weighted by the respective COI factor at each location except location n can be written as follows:

$$\sum_{\substack{j=1 \\ l \neq n}}^{l} E_j coi_j = \sum_{j=1}^{l} E_j coi_j - E_n coi_n \quad (16)$$

The sum $E_{totcoi}$ of all total erlangs $E_j$ per location multiplied by the respective COI factor $COI_j$ can then be determined without knowing the number of access points or users per access point.

$$E_{totcoi} = \sum_{j=1}^{l} E_j coi_j \quad (17)$$

Using equations (15), (16) and (17) allows determining the erlangs $E_{jntot}$ generated at location n from all the other locations.

$$E_{jntot} = \frac{U_n}{U_{tot} - 1} (E_{totcoi} - E_n coi_n) \quad (18)$$

Given the need to calculate a single access point at a time and increment the number of users $u_k$ in that access point until the connection limitation is exceeded, the erlangs $E_{sjntot}$ generated by a given number of users $u_k$ needs to be determined. Multiplying equation (18) with Uk divided by the total number of users at that location $U_n$ provides the required erlang value, as shown below:

$$E_{sjntot} = E_{jntot}\frac{u_k}{U_n} = \frac{u_k}{U_{tot}-1}(E_{totcoi} - E_n coi_n) \quad (19)$$

Traffic from Access Point to All Other Access Points at the Same Location ($E_{skjtot}$)

The following equations can be used to determine the number of erlangs that are generated from a single access point at a given location n with a given number of users $u_k$ to all the other access points j at the same location n. Note that the community of interest (COI) factor between access points at single location is assumed to be zero percent, unless otherwise indicated or provided as part of the inventory information.

(20) $\rho_{skj} = \dfrac{u_j}{\overleftrightarrow{U_{tot}}}$    $\rho_{skj}$ = Probability that a user at a given access point j at location n is called by a user from access point k at location n.
$u_j$ = Total number of users at access point j.

$\overleftrightarrow{U_{tot}}$ = Number of other users a user in access point k actually sees; this number depends on the COI factor at this location n. As an example, assume a completely independent location with a COI factor of zero. A user at this location never generates traffic to access points outside this location. Thus, a user "sees" only the users on the local access points at the location (which by definition have a COI factor of 100%) and the user "sees" none of the access points outside of this location. If the COI for the location is one hundred percent, then the user "sees" every user in the system (not just the local users at the location).

The number of users a subscriber in access point k actually sees ($\overleftrightarrow{\phantom{U}}$) is the number of users in all the other locations ($U_{tot}-U_n$) multiplied by the COI factor of this location ($coi_n$) plus the total number of users at this location ($U_n$) minus 1.

$$\overleftrightarrow{\phantom{U}} = (U_{tot}-U_n)coi_n + U_n - 1 = U_{tot}coi_n + U_n(1-coi_n) - 1 \quad (21)$$

where $U_n$=total number of users at location n and $U_{tot}$=total number of users in the system.

(22) $E_{skj} = \rho_{skj}E_{sk}$    $E_{skj}$ = Erlangs generated by users at access point k at location n, directed to access point j at location n.
$p_{skj}$ = Probability that a user at a given access point j at location n is called by a user from access point k at location n.
$E_{sk}$ = Total erlangs generated at access point k.
(23) $E_{sk} = u_k P_{ot}P_{st}E_{kavg}$    $u_k$ = Total number of users at access point k.
$E_{kavg}$ = Average erlangs per user at access point k (this may includes regular and call center users as well as incoming and outgoing traffic). Given that each access point may be calculated by user type (digital, analog, etc), $E_{kavg}$ needs to be calculated for each user type individually for the access point k and then summed when performing the actual iteration.

The average erlangs per user at access point k ($E_{kavg}$) may be part of the information received during the step 152. Alternatively, the average erlangs per user at location k ($E_{kavg}$) may be determined by summing up the Erlangs of all users at location k and dividing the total by the total number of users at location k.

Using equations (20), (21), (22) and (23) allows calculation of the erlangs $E_{skj}$ generated at access point j at location n by users at access point k at location n.

$$E_{skj} = \frac{u_k P_{ot} P_{st} E_{kavg} u_j}{U_{tot}coi_n + U_n(1-coi_n) - 1} \quad (24)$$

In order to calculate the erlang traffic $E_{skjtot}$ to all other access points j at location n from access point k at location n, $E_{skj}$ needs to be summed up over all existing access points s except access point k.

$$E_{skjtot} = \sum_{\substack{j=1 \\ j\neq k}}^{s} \left(\frac{u_k P_{ot} P_{st} E_{kavg} u_j}{U_{tot}coi_n + U_n(1-coi_n) - 1}\right) \quad (25)$$

$$= \frac{u_k P_{ot} P_{st} E_{kavg}}{U_{tot}coi_n + U_n(1-coi_n) - 1} \sum_{\substack{j=1 \\ j\neq k}}^{s} u_j$$

The sum of all users at location n except users on access point k can be written as follows:

$$\sum_{\substack{j=1 \\ j\neq k}}^{s} u_j = U_n - u_k \quad (26)$$

Using equations (25) and (26) allows determining the erlangs $E_{skjtot}$ generated at access point k at location n to all other access points j at location n.

$$E_{skjtot} = \frac{u_k E_{kavg}(U_n - u_k)}{U_{tot}coi_n + U_n(1-coi_n) - 1} \quad (27)$$

The connections determined by this erlang value are one component that defines the number of gateway channels required on the access point.

Traffic to the Access Point from All Other Access Points at the Location ($E_{sjktot}$)

If the traffic distribution within a location is assumed to be homogenous (i.e., COI factor equals zero percent) and does not change between access points, the traffic generated from a single access point to all the other access points at the location is the same as the traffic generated from all the other access points at the location to that access point. Thus $E_{sjktot}$ equals $E_{skjtot}$ and is given by equation (27).

$$E_{sjktot} = E_{skjtot} = \frac{u_k P_{ot} P_{st} E_{kavg}(U_n - u_k)}{U_{tot} coi_n + U_n(1 - coi_n) - 1} \quad (28)$$

Trunk Traffic into Local IP Network ($E_{st}$)

The trunk traffic into the location network (e.g., the network 127) from a given access point depends on the following parameters:

The number of users on a given access point.
The number of users at the location containing the access point.
Local trunking on the access point for incoming and outgoing trunk traffic.
Percentages of incoming/outgoing trunk calls that are handled locally (customers may want to provide only minimal trunking at a site for emergency calls in case the network fails or customers may want centralized DID (Direct Inward Dialing) lines but local CO trunks).

In order to minimize traffic on the local LAN (e.g., the communications network 127) and maximize the number of users per access point, each access point should have its own local trunks and its own trunk group.

Outgoing Trunk Calls

Having a unique trunk group for the users at an access point ensures that all outgoing trunk calls for the access point will be going through to the communication network 144 directly via trunk cards on that access point (e.g., via local trunks) and thus creating no load on the local communications network (e.g., the communications network 127) or the wide area network (e.g., the communications network 132) and requiring no gateway connections on the access point to the local communications network (e.g., the communications network 127) at the location.

When $u_k$=total number of users at access point k at location n, $E_{kavg}$=average erlangs per user at access point k at location n, $t_n$=the percentage of trunk calls at location n (typically sixty-eight percent can be used as an assumption) and is equal to $1-P_{st}$, $t_{co}$=the percentage of calls from the access point k via local CO trunks out of the total trunk call percentages $t_n$ at location n (typically fifty percent can be used as an assumption), and $t_{col}$=the percentage of CO calls that are staying local out of the percentage of CO calls $t_{co}$ at location n (typically one hundred percent or zero percent, which is equivalent to centralized CO trunking), the outgoing trunk erlangs generated towards the host $E_{coh}$ for an access point k at location n can be determined as follows:

$$E_{coh} = u_k E_{kavg} t_n t_{co}(1 - t_{col}) \quad (29)$$

Note that $E_{coh}$ is zero for the location n if there is one hundred percent local trunking at the location n because the expression $(1-t_{col})$ will be equal to zero.

Incoming Trunk Calls

When $u_k$=total number of users at access point k at location n, $E_{kavg}$=average erlangs per user at access point k at location n, $t_n$=the percentage of trunk calls at location n (typically sixty-eight percent can be used as an assumption) and is equal to $1-P_{st}$, $t_{did}$=the percentage DID calls out of total trunk calls $t_n$ at location n (typically fifty percent can be used as an assumption), and $t_{didl}$=the percentage of DID calls that are staying local out of the percentage of DID calls $t_{did}$ at location n (typically one hundred percent or zero percent, which is equivalent to centralized DID trunking), the incoming trunk erlangs coming from the host $E_{didh}$ for a access point k at location n can be calculated as follows:

$$E_{didh} = u_k E_{kavg} t_n t_{did}(1 - t_{didl}) \quad (30)$$

Note that $E_{didh}$ is zero at the location n if there is one hundred percent local trunking at the location n because the expression $(1-t_{didl})$ will be equal to zero.

DID numbers are typically purchased in groups and the central office in the communication network 144 may allocate incoming calls either sequentially (starting with the lowest DID number) or randomly. It may not be practical to assume that a customer can purchase a separate DID group for each access point. Thus, incoming trunk call will most likely not end up at the access point where the actual destination subscriber is located. Thus, additional erlangs are generated by the DID calls coming in on the "wrong" trunk cards. These calls have to travel through the local LAN to their final destination increasing local LAN traffic and using up additional gateway channels on the access point, both on the originating access point and the destination access point.

In order to minimize network traffic, DID numbers may have to come in randomly and each access point may have to have the appropriate number of DID trunks for the number and type of subscribers on that access point.

| (31) | $\rho_{ti} = \dfrac{1}{C_{tin}}$ | $\rho_{ti}$ = Probability that an incoming trunk call appears at a specific port on a trunk card. $C_{tin}$ = Total number of incoming trunk channels at location n. |
|---|---|---|
| (32) | $\rho_{tik} = \dfrac{c_{tik}}{C_{tin}}$ | $\rho_{tik}$ = Probability that an incoming trunk call appears at the access point where the actual destination subscriber is located. $c_{tik}$ = Number of incoming trunk channels in access point k at location n $C_{tin}$ = Total number of incoming trunk channels at location n. |
| (33) | $E_{tijk} = u_k E_{didl}(1 - \rho_{tik})$ | $E_{tijk}$ = Erlangs generated by incoming DID calls on all the other access points, destined for users in access point k at location n. $E_{didl}$ = Average DID trunk erlangs per user into local trunks. $u_k$ = Total number of users at access point k at location n. |

When $u_k$=total number of users at access point k at location n, $E_{kavg}$=average erlangs per user at access point k at location n, $t_n$=the percentage of trunk calls at location n (typically sixty-eight percent), $t_{did}$=the percentage of DID calls out of total trunk calls $t_n$ at location n (typically fifty percent), and $t_{didl}$=the percentage of DID calls that are staying local out of the percentage of DID calls $t_{did}$ at location n (typically one hundred percent or zero percent, which is equivalent to centralized DID trunking), $E_{didl}$ can be calculated as follows:

$$E_{didl} = E_{kavg} t_n t_{did} t_{didl} \quad (34)$$

Note that $E_{didl}$ is zero for the location n if there is no local trunking at the location n because $t_{didl}$ will be equal to zero.

When b=a percentage blocking (typically one percent), and $c_{tk}$=number of DID and CO trunk channels required in access point k at location n, $c_{tk}$ can be calculated using an ErlangB procedure described below as follows:

$$c_{tk} = ErlangB\ (u_k E_{kavg} t_n t_{didh} b, u_k) \quad (35)$$

Blocking refers to the situation wherein a user is not able to place a call because an access point or the main switch cannot seize a trunk and complete the call. For example, a blocking of one percent means that enough trunks are provided that, on average, only one percent of the calls will not be completed due to failure to seize a trunk In some embodiments, a standard ErlangB calculation may not return adequate results for a small number of users and/or users with high erlang values, since the standard ErlangB calculation does not know how many users are generating the erlangs. In order to overcome this shortcoming of the standard ErlangB calculation, an enhanced ErlangB calculation can be used that does not return more lines/connections for the access point than there are users. For example, the following code may implement such an enhanced ErlangB calculation:

```
Function ErlangBTrunksEnhanced(erlangs, blocking, users)
'
If erlangs > 0 Then
        Fact = 1
        trunks = 0
    lab1: trunks = trunks + 1
        Fact = (erlangs * Fact) / ((erlangs * Fact) + trunks)
        blockage = 1 – Fact
        If blockage < 1 – blocking Then GoTo lab1
        If trunks < users Then
                ErlangBTrunksEnhanced = trunks
        Else
                ErlangBTrunksEnhanced = users
        End If
        Else: ErlangBTrunksEnhanced = 0
    End If
End Function
``` where the function returns the number of lines that are needed.

The variable $c_{tk}$ can be calculated as follows:

$$c_{tik} = roundup\ (c_{tk} t_{did}) \quad (36)$$

The variable $C_{tin}$ is given by the following equation:

$$C_{tin} = roundup\left(\frac{U_n}{u_k} c_{tik}\right) \quad (37)$$

where $U_n$=Total number of users at location n.

Using equations (32), (36) and (37) shows that $\rho_{tik}$ can be approximated by $$\frac{u_k}{U_n}.$$

$$\rho_{tik} = \frac{c_{tik}}{C_{tin}} = \frac{c_{tik}}{roundup\left(\frac{U_n}{u_k} c_{tik}\right)} \cong \frac{u_k}{U_n} \quad (38)$$

Thus, the ratio of trunk channels per access point divided by the total number of trunk channels per location is equivalent to the ratio of number of users per access point divided by the total number of users per location.

Using equation (38) results in a $\rho_{tik}$ which may be slightly too small, thereby increasing the Erlangs generated by incoming DID calls, which is conservative.

Using $$\frac{u_k}{U_n}$$

instead of $$\frac{c_{tik}}{C_{tin}}$$

eliminated the ErlangB calculation which reduces the number of required iterations considerably, thereby potentially speeding up the overall calculations while the introduced error is minimal.

Using equations (33), (34) and (38) allows determining the erlangs that are generated by the randomly arriving DID calls on all the other access points j destined for users on access point k at location n.

$$E_{tijk} \cong u_k E_{kavg} t_n t_{did} t_{didl}\left(1 - \frac{u_k}{U_n}\right) \quad (39)$$

Given that the traffic distribution within one location is assumed to be homogenous, the erlangs that are generated by randomly arriving DID calls on all the other access points j destined for users on access point k at location n are equivalent to the erlangs generated by randomly arriving DID calls on access point k at location n destined for users on all the other access points j.

In mathematical terms:

$$E_{tikj} = E_{tijk} \cong u_k E_{kavg} t_n t_{did} t_{didl}\left(1 - \frac{u_k}{U_n}\right) \quad (40)$$

Note that $E_{tikj}$ is zero if there is no local trunking at a given location. The total trunk traffic into the local IP network (e.g., the communication network 127) is the sum of all the trunk erlang values given by the equation below:

$$E_{st} = E_{coh} + E_{didh} + E_{tikj} + E_{tijk} = E_{coh} + E_{didh} + 2E_{tikj} \quad (41)$$

The individual erlang values are defined by equations (29), (30), (39) and (40) described above.

From the parameters determined during the step 190, the number of resources needed for the access point can be determined during the step 192. For example, the total number of resources needed for the access point 122 can include resources to support users, resources to support local trunking, and resources to connect to the communications network 127.

The total erlang traffic $E_{lan}$ into the local LAN IP network (e.g., the communications network 127) for an access point with a given number of users $u_k$ can be defined by the sum of all the Erlang values derived in the previous equations. That is:

$$E_{lan} = E_{snjtot} + E_{sjntot} + 2E_{skjtot} + E_{st} \quad (42)$$

The individual erlang values are defined by equations (10), (19), (28) and (41) The erlang value defined by equation (42) above takes all the interactions of the whole network on an individual access point with a given number of users into account. That includes traffic generated by all the other locations, traffic to the other locations, traffic from the other access points, traffic to the other access points, trunk traffic to and from the main switch 128 and locally generated DID traffic by randomly incoming calls. The number of required gateway channels $C_{ncui}$ on the access point can be determined by performing an ErlangB calculation on $E_{lan}$ according the equation below:

$$C_{ncui} = ErlangB\,(E_{lan}, b, u_k) \tag{43}$$

Being able to calculate the total erlangs into the network per access point for a given number of users, allows incrementing the number of users until the maximum number of gateway channels is exceed. That number of users defines the maximum number of users per access point that can be supported in a given network environment.

The number of DID and CO trunk cards needed for the access point is determined by calculating the DID trunk channels $c_{did}$ and CO trunk channels $c_{co}$ with an enhanced ErlangB calculation based on the current number of users $u_k$, blocking b, average DID trunk erlangs per user into local trunks $E_{didl}$, and average CO trunk erlangs per user into local trunks $E_{col}$ according to the equations below:

(44) $c_{did} = ErlangB(u_k E_{didl}, b, u_k)$  $c_{did}$ = required DID trunk channels. $E_{didl}$ is defined in equation(34).

(45) $c_{co}\, ErlangB(u_k E_{col}, b, u_k)$  $c_{co}$ = required CO trunk channels. $E_{col}$ is defined below.

(46) $E_{col} = u_k E_{kavg} t_n t_{co} t_{col}$  $E_{col}$ = Average CO trunk erlangs per user into local trunks.
$E_{kavg}$ = Average erlangs per user at access point k at location n
$t_n$ = percentage trunk calls at location n (typically sixty eight percent).
$t_{co}$ = percentage CO calls out of total trunk call percentge $t_n$ at location n (typically fifty percent).
$t_{col}$ = percentage of calls that are staying local out of percentage CO calls $t_{co}$ at location n (typically one hundred percent or zero percent, which is equivalent to centralized CO trunking).

(47) $T_{did} = roundup \dfrac{c_{did}}{C_{did}}$  $C_{did}$ = number of DID trunk cards for the access point.
$C_{did}$ = number of channels per DID trunk card usable in the access point.

(48) $T_{co} = roundup \dfrac{c_{co}}{C_{co}}$  $T_{co}$ = number of CO trunk cards for the access point.
$C_{co}$ = number of channels per CO trunk card usable in the access point.

Note that for T1 and PRI type trunking the incoming and outgoing trunk channels may be on the same card and the calculation should be done by adding up the DID and CO channels calculated in equations (44) and (45) by an ErlangB calculation. Also note that calculating the required channels for CO and DID calls separately is conservative. Calculating the required trunk channels and splitting them up into CO and DID after the ErlangB calculation is more aggressive and may require less trunk channels for the access point.

During the step 194, the resources needed by the access point to support the number of users established in the step 188 is compared to the possible resources that the access point can have. The required access point channels are calculated according to equation (43) and $C_{ncui}$ is checked whether it is larger than the maximum number of available or possible gateway channels for the access point.

If $C_{ncui}$ is larger than the gateway channels possible on the access point, the method 180 moves to the step 196 where the flag originally cleared in the step 186 is not set. The number of users assumed for the access point is then decreased during the step 198 and the method proceeds back to the step 190. Thus, the number of users may be need decremented one at a time and $E_{lan}$ and $C_{ncui}$ are re-calculated until $C_{ncui}$ is smaller than the number of available gateway channels for the access point.

If $C_{ncui}$ is not larger than the gateway channels possible on the access point, the method 180 moves to the step 200 during which a check is made to see if the flag has previously been set since being cleared during the step 186. If the flag has been set, it means that during a prior user setting (e.g., a prior number of users assumed for the access point), the resulting $C_{ncui}$ was larger than the gateway channels possible on the access point and the number of users was decremented at least once during the step 198. Thus, the method 180 can move to the step 156.

If the determination during the step 200 is that the flag 200 has not been set, the method 180 moves back to the step 188 where the number of users assumed for the access point is increased as previously discussed above.

Given the process described above, the number of users supported by each (except the last one) access point at a location is increased until either the number of users the access point can support is reached or the gateway channels limitations for the access point are exceeded. When the number of users for the access point are finalized, the number of cards needed to support the users can then be determined and the resulting access point design may support more than one type (e.g., analog, digital, IP) of user.

Determining Number of Gateway Cards for Main Switch

In some embodiments, the methods 150 or 180 may include an additional step wherein the number of gateway cards needed for the main switch 128 may be determined. Such a determination may require that the total erlangs to other locations from the main switch 128 and the total erlangs from the other locations to the switch 128 be calculated.

Traffic to Access Point Locations from Main Switch

Determining erlangs that are generated from the main switch 128 in the location n (e.g., the location 102) with a given number of users $U_n$ to all the other locations j are the same as already described above. That is:

$$E_{njtot} = U_n E_{navg} \dfrac{coi_n}{U_{tot} - 1}(U_{tot} - U_n) \tag{49}$$

$$= E_n \dfrac{coi_n}{U_{tot} - 1}(U_{tot} - U_n)$$

Traffic to Main Switch from Access Point Locations

Determining the erlangs that are generated at the main switch 128 at the location n (e.g., the location 102) with a given number of users $U_n$ from all the access point locations j are the same as already described above. Using equation (18)

allows determining the erlangs $E_{sjntot}$ generated at the main switch 128 for a given number of users $U_n$ from all the locations, as follows:

$$E_{jntot} = U_n \frac{E_{totcoi} - E_n coi_n}{U_{tot} - 1} \quad (50)$$

Using equations (49), (50) and the enhanced ErlangB function described above allows determining the number of channels into the wide area network (i.e., the communication network 132) for the main switch 128.

Trunk Traffic from Access Point Locations

Depending on local trunking configurations, each access point generates trunk traffic on the main switch 128 and/or receives incoming trunk traffic from the main switch 128. The formulas for an individual access point have already been discussed above. Using equation (29), the total CO trunk traffic from a given location towards the main switch can be written as follows, where $u_k$=total number of users at access point k at location n, $E_{kavg}$=average erlangs per user at access point k at location n, $t_n$=percentage trunk calls at location n (typically sixty-eight percent), $t_{co}$=percentage CO calls out of total trunk call percentage $t_n$ at location n (typically fifty percent), $t_{coln}$=percentage CO calls that are staying local out of the percentage CO calls $t_{co}$ at location n (typically one-hundred percent of zero percent, which is equivalent to centralized CO trunking), and $E_n$=total erlangs at location n.

$$E_{cohloctot} = \sum_{k=1}^{s} E_{coh} \quad (51)$$
$$= \sum_{k=1}^{s} u_k E_{kavg} t_n t_{co} (1 - t_{coln})$$
$$= E_n t_n t_{co} (l - t_{coln})$$

Note that $E_{cohloctot}$ is zero if there is one hundred percent local trunking at a given location.

The total CO traffic from all access point locations is given in equation (52):

$$E_{cohtot} = \sum_{j=1}^{n} E_{coh} \quad (52)$$
$$= \sum_{j=1}^{n} E_j t_j t_{co} (l - t_{colj})$$
$$= t_{co} \sum_{j=1}^{n} E_j t_j (l - t_{colj})$$

Trunk Traffic to Locations

Using equation (30), the total incoming trunk erlangs coming from the main switch 128 towards a given location can be written as follows, where $u_k$=total number of users at access point k at location n, $E_{kavg}$=average erlangs per user at access point k at location n, $t_n$=percentage trunk calls at location n (typically sixty-eight percent), $t_{did}$=percentage DID calls out of total trunk call percentage $t_n$ at location n (typically fifty percent), and $t_{didl}$=percentage DID calls that are staying local out of percentage of DID calls $t_{did}$ at location n (typically one hundred percent or zero percent, which is equivalent to centralized DID trunking).

$$E_{didhloctot} = \sum_{k=1}^{s} E_{didh} \quad (53)$$
$$= \sum_{k=1}^{s} u_k E_{kavg} t_n t_{did} (1 - t_{didln})$$
$$= E_n t_n t_{did} (l - t_{didln})$$

Note that $E_{didhloctot}$ is zero if there is one hundred percent local trunking at a given location.

The total DID traffic to all locations can be determined as follows:

$$E_{didhtot} = \sum_{j=1}^{n} E_{didh} \quad (54)$$
$$= \sum_{j=1}^{n} E_j t_j t_{did} (l - t_{didlj})$$
$$= t_{did} \sum_{j=1}^{n} E_j t_j (l - t_{didlj})$$

Using equations (49), (50), (52) and (54) the required gateway channels required for the main switch 128 can be calculated as shown in the following equation.

$$Ch_{STMt} = ErlangBTrunksEnhanced(E_{njtot} + E_{jntot} + E_{cohtot} + E_{didhtot}, b, U_{tot} - U_n) \quad (55)$$

where b=Blocking and is typically one percent.

Optimization Options

In some embodiments, a considerable amount of time may be needed to calculate or designed a large IP distributed system. Thus, it may be desirable to minimize the calculation time whenever possible.

Given that all access points for a given user type and a given location are identical (except for the last access point that accommodates leftover users) it is not necessary to calculate each access point individually. It is sufficient to calculate the first access point for each user type and then increment the number of users that have to be processed by the number of users on the first calculated access point until all users are allocated (except for the left-over users that need to be calculated separately).

Optimizing Packaging of Access Points

There are at least two ways in which access points can be optimized: (1) by the minimum number of access points; and (2) by the minimum number of line cards in the access points. Both methods have advantages and it has to be determined on a per location bases which method is more beneficial. Note that packaging depends on user type and in order to fully optimize a system both methods would have to be calculated for each user type.

In order to minimize the number of access points the number of users needs to be determined that fully utilize the available access point gateway channels as previously discussed above with regard to equations (44) to (48). Typically the optimized number of users per access point is not a multiple of the users per line card. This may result in line cards being placed on the access point that are not completely filled up. However, customers would not be allowed to activate users on those cards, since blocking will increase and the system would not behave according to the parameters it has been designed originally.

In some cases those left-over cards in an access point are almost filled up and it is in the customer's interest to minimize the number of access points instead of the line cards because the cost of additional access points could be much higher than the cost for the unused ports on the leftover line cards.

Minimizing the number of line cards in an access point can be easily done by incrementing the number of users on the access point during the step 188 by multiples of number of users per line card until the access point gateway limitation is exceeded. This method guarantees that all the line cards are fully utilized but may result in additional access points.

Access Point Configuration

In some embodiments, the method 150, 180 may include a step where an access point for a location is configured or packaged based on the numbers and types of users supported on the access point.

Interface

Figure 6:
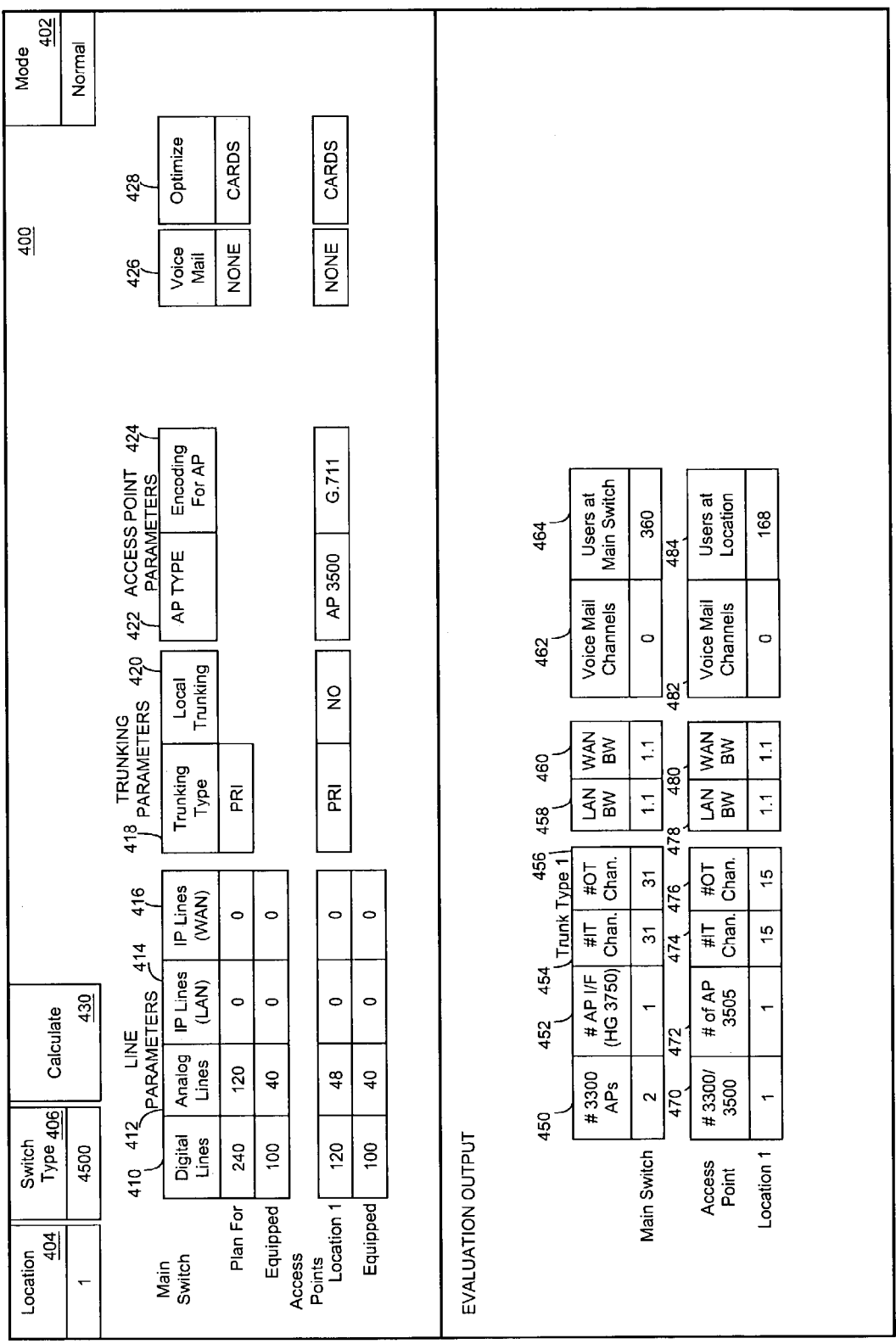
FIG. 6 is a diagram of a representative interface that may be used in conjunction with some embodiments of the present invention.

In some embodiments, inventory or other information regarding one or more locations may be entered by, or received from, a user having access to an interface, Web site, dashboard, or other software. For example, now referring to FIG. 6, one representative interface 400 is illustrated that may be used to obtain inventory information as part of the step 152. The interface 400 is particularly well suited for situations in which only basic information is available and a quick design time is required. Using the interface 400, a sales representative can enter customer provided information in real time and provide a rough network design within minutes based on conservative assumptions.

For purposes of explanation, but not limitation, of the interface 400, the interface is designed for use with products and devices provided by the Siemens Corporation, including, but not limited to Model 3300 and Model 3500 access points, HiPath 4300 and HiPath 4500 main switches, and Model 3505 extenders for the Model 3500 access point. The Model 3300 access point includes sixteen slots for cards while the Model 3500 access point includes three slots for cards. Model 3505 extenders, each of which supports up to four cards, can be added to the Model 3500 access point. The configurations of HiPath 4300 and HiPath 4500 main switches may include one or more Model 3300 access points.

The interface 400 may allow for different modes (e.g., normal, advanced, expert) by entering or selecting different modes in block 402. Text block 404 may allow a user of the interface to enter or select a number of different locations (e.g., "1") while text block 406 may allow the user to enter or select a switch type (e.g., "4500") for the main switch 128. The interface 400 includes text boxes 410, 412, 414, 416 for allowing the user to enter or select the number of digital lines, analog lines, IP lines (LAN), and IP lines (WAN) for both the main switch and access points at the first location. For purposes of the boxes 410, 412, 414, 416, a digital line is the same as a digital user, an analog line is the same as an analog user, etc. If more than one location is entered in the box 404, the interface 400 may display other text boxes for entry of information for access points for the other locations. Information entry may be provided on a "plan for" basis as well as an "equipped" basis. That is, a user of the interface may want to design a system in anticipation of the number of users/lines planned for, even though the system many only need to support the number of users/lines given or entered in the "equipped" boxes. For example, as illustrated in the interface 400, 240 digital users and 120 analog users at the main switch 128 should be planned for when designing the system, although only one hundred digital users and eighty analog users currently need to be supported directly by the main switch 128. Similarly, 120 digital users and forty-eight analog users at location "1" should be planned for, even though one hundred digital users and forty analog users currently need to supported at location "1".

The interface 400 also may include text boxes 418, 420 where a user of the interface can select or enter the trunking type (e.g., analog, PRI, T1) for both the main switch 128 and the access points at the location "1", and whether the trunking for the access points at the location "1" are localized or not. The location may use a different or additional trunk type for local trunking than the main switch uses for central trunking.

The interface 400 also may include a text box 422 where the user can enter or select from possible access point types that may be used. Different types of access points may have different capabilities (e.g., be ability to support different numbers of channels, users, etc.).

The interface 400 also may include a text box 424 where the user can enter or select from possible encodings used between the access points for the PCM (pulse code modulation) data stream(e.g., G.711 encoding, G.729A encoding). Setting the encoding to G.711 provides no compression for the PCM data stream and the data rate is set at 64 kbs. Setting the encoding to G.729A provides compression to 8 kbs for the PCM data stream. Different types of encoding may impact the bandwidth on the network connecting access points at a location (e.g., the network 127) and the bandwidth on the network connecting a location to the main switch 128 (e.g., the network 132).

The interface 400 also may include a text box 426 where a user of the interface 400 can indicate whether or not there is a voicemail application operating on either the main switch or the access point(s), and whether the voice mail is localized or centralized. Voicemail can increase the traffic and bandwidth within a location and between locations, as previously described above.

The interface 400 also may include a text box 428 where a user of the interface can indicate whether or not the design of the access points should be optimized by cards within the access points or by the number of access points.

Once the user has entered the appropriate information, the user may select or click on the "Calculate" button 430, wherein a device or software may use the information to conduct the methods 150, 180 and/or to determine the number of access points needed for the different locations and configurations for the main switch (which may support one or more different locations). In addition, the interface 400 may provide information regarding bandwidth needs or requirements, the total number of access points needed for all locations, the total number of lines needed for all locations, the total number of shelves or access point interfaces needed for the main switch 128, etc. Information needed for the methods 150, 180 that are not provided by or via the interface 400 can be assumed or based on prior default settings. For example, the community of interest for each location can be assumed to be homogenous, encoding on a network (e.g., the network 132, any agent types for a call center can be assumed to be digital, any needed ACD overtrunking can be assumed to be twenty percent, the percentage of blocking in the system can be assumed to be one percent, the percentage in of all trunk calls can be assumed to be fifty percent, the percentage out of all trunk calls can be assumed to be fifty percent, the number of any phantom lines needed can be assumed to be ten percent of all lines, encoding on the network at a location (e.g., the network 127) connecting access points can be assumed to be G.711 type encoding, sampling time on the network connecting access points can be assumed to be thirty milliseconds, a jitter buffer on the network connecting access points can be assumed to be fifty milliseconds, encoding on the network connecting a location and the main switch 128 (e.g., the network 132) connecting access points can be assumed to be G.711 type encoding, sampling time on the network connecting a location and the main switch 128 can be assumed to be thirty milliseconds, a jitter buffer on the network connecting a location and the main switch 128 can be assumed to be fifty milliseconds, the traffic value for each digital user in the system can be assumed to be 6.0 CCS, the traffic value for each analog user in the system can be assumed to be 6.0 CCS, and the traffic value for each IP user in the system can be assumed to be 6.0 CCS, the traffic value for each voice mail user in the system can be assumed to be 0.6 CCS, and the traffic value for each ACD call center agent in the system can be assumed to be 32 CCS. Other assumptions may be made regarding the number of phone adapters, call center agents, agent types, etc. for both the main switch 128 and each of the locations.

Output text boxes in the interface 400 (and the other interfaces discussed herein) may be used to provide data or other information regarding the results of the method 150 or the method 180 and/or may be used in or to implement the step 158. For example, output text boxes 450 and 452 provide information regarding the number of Model 3300 access points and access point interfaces (AP I/F) needed for the main switch. For purposes of the examples described herein, the access point interfaces are assumed to be HG 3750 interfaces provided by the Siemens Corporation, each of which can support gateway functionality for thirty simultaneous full duplex voice connections. Also, for purposes of the examples herein, only one location is assumed and only one access point is needed for the location.

Output text box 454 provides information regarding the number of incoming trunk channels needed for the main switch. The required amount of incoming trunking may depend on whether or not local trunking is available on the access points or not and the type (e.g., PRI, T1, analog) of trunking selected in box 418. The value in the output box 454 can be determined by calculating the overall incoming trunk traffic terminating at the main switch 128 (including traffic for the access points if applicable) and using the enhanced ErlangB calculation described above.

Output text box 456 provides information regarding the number of outgoing trunk channels needed on the main switch. The required amount of incoming trunking may depend on whether or not local trunking is available on the access points or not and the type (e.g., PRI, T1, analog) of trunking selected in box 418. The value in the output box 456 can be determined by calculating the overall outgoing trunk traffic terminating at the main switch 128 (including traffic from the access points if applicable) and using the enhanced ErlangB calculation described above.

Output text box 458 provides information regarding the Mbits/sec. of bandwidth needed on the local LAN for the main switch 128 (e.g., the network 134). The bandwidth may include traffic to all local IP telephones connected to the main switch 128 or other users as well as traffic generated by the access points. The amount of bandwidth can be determined by multiplying the number of all connections into the local network with the bandwidth required for a connection. The required bandwidth per connection is determined by the selected encoding plus IP overhead.

Output text box 460 provides information regarding the Mbits/sec. of bandwidth required on the WAN (e.g., the network 132) as a result of the main switch 128 and the network 134, which may include traffic to local IP WAN phones connected to the main switch 128 as well as traffic generated by the access points to the main switch 128. The amount of bandwidth can be determined by multiplying the number of all connections required on the main switch with the bandwidth required for a connection. The required bandwidth per connection is determined by the selected encoding plus IP overhead.

Output text box 462 provides information regarding the number of required voice mail channels on the main switch 128, which may include voicemail channels required by access points.

Output text box 464 provides information regarding the total number of users directly supported by or connected to the main switch 128.

In addition to providing information regarding the main switch that supports one or more locations, the interface 400 also may provide information regarding the access points needed at the locations. For example, for location "1", the interface 400 may provide information in output text box 470 regarding the number of Model 3300 and/or Model 3500 access points needed based on the information provided (particularly the information entered into box 422 which forces access points at the location to be a certain type), information in text box 472 regarding the number of 3505 extenders needed based on the information provided, and information in text box 474 regarding the number of required local incoming trunk channels for the access point for the trunk type (in this case PRI) entered in the box 418 for the location "1". If local trunking (e.g., text box 420) is set to "NO", no incoming trunks are required on the access point. Similarly, the interface 400 may provide information in text box 476 regarding the number of required outgoing trunk channels for the access point for the trunk type (in this case PRI) entered in the box 418 for the location "1". If local trunking (e.g., text box 420) is set to "NO", no outgoing trunks are required on the access point. The values for the output boxes 474 and 476 can be determined by using the trunking erlang values calculated earlier and using the enhanced ErlangB calculation to determine the required number of incoming and outgoing trunk channels.

Output text box 478 provides information regarding the Mbits/sec. of bandwidth required on the local computer network for the access point (e.g., the network 127) at the location "1" to which the access points referenced in output text box 470 are connected. The amount of bandwidth can be determined by multiplying the number of all connections into the local network with the bandwidth required for a connection. The required bandwidth per connection is determined by the selected encoding plus IP overhead.

Output text box 480 provides information regarding the Mbits/sec. of bandwidth required in the wide area network 132 as a result of the access point and the network 127. The amount of bandwidth can be determined by multiplying the number of all connections on the access points directed into the network 132, with the bandwidth required for a connection. The required bandwidth per connection is determined by the selected encoding plus IP overhead.

Output text box 482 provides information regarding the number of required voice mail channels at the location "1" and can be determined by using the enhanced ErlangB function on the voicemail erlangs calculated earlier.

Output text box 484 provides information regarding the total number of users directly supported at the location "1" and can be determined by summing up the users on all access points at location "1".

Figure 7:
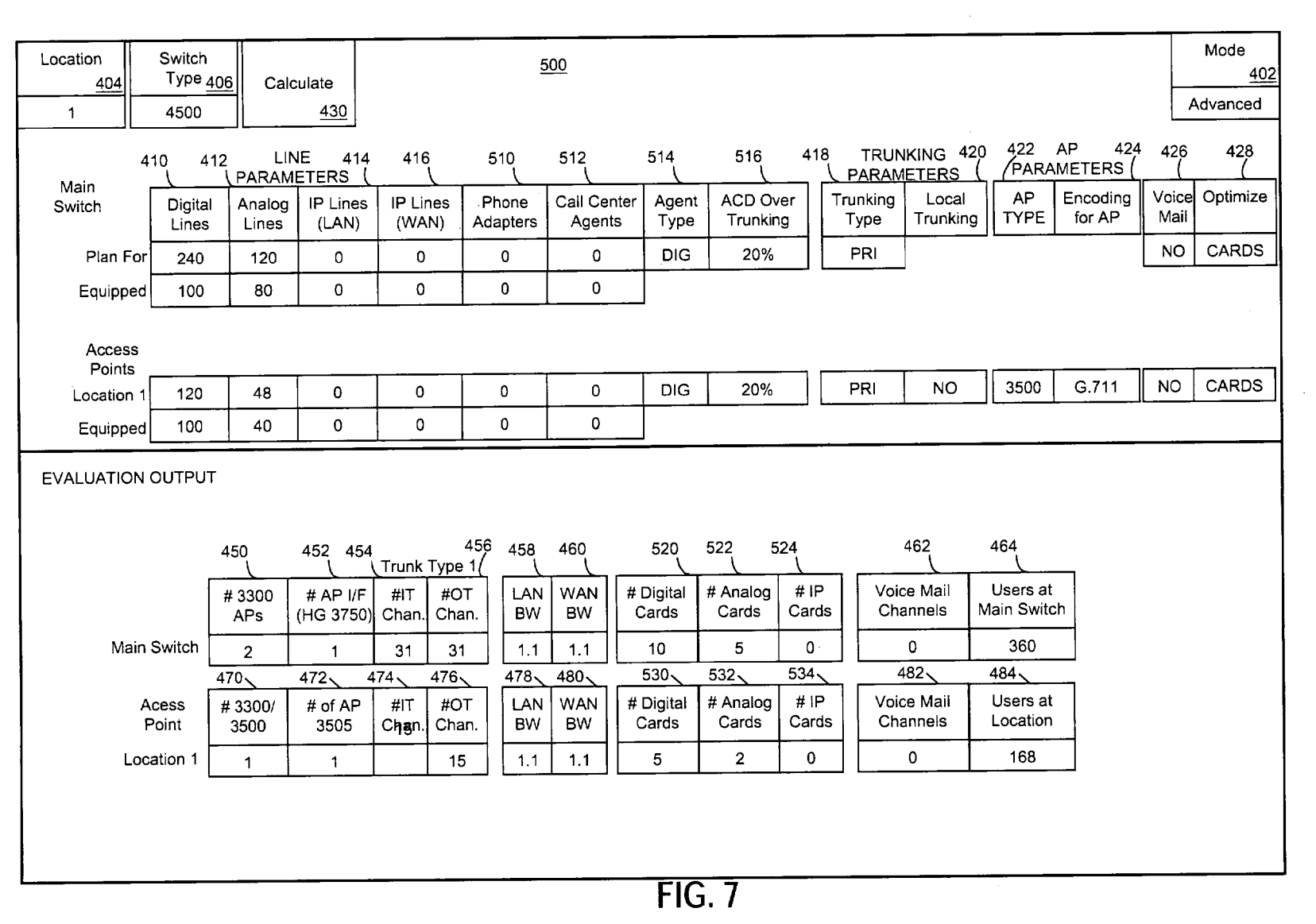

Now referring to FIG. 7, another representative interface 500 is illustrated that may be used to obtain or otherwise determine inventory information in some embodiments of the step 152. The interface 500 is particularly well suited for situations in which basic information is available, call center agents are involved and a quick design time is required. Using the interface 400, a sales representative can enter customer provided information in real time and provide a rough network design within minutes based on conservative assumptions. The interface 500 includes the input boxes 402, 404, 406, 410, 412, 414, 416, 418, 420, 422, 424, 426, and 428, along with the "Calculate" button 430, previously discussed above. In addition, the interface 500 includes the output boxes 450, 452, 454, 456, 458, 460, 462, 464, 470, 472, 474, 476, 478, 480, 482 and 484 previously discussed above.

In addition, the interface 500 may include an input text box 510 in which a user of the interface 500 may provide information regarding the number of digital and analog telephone adapters supported by the main switch. The interface 500 also may include an input text box 512 in which the user of the interface 500 can provide information regarding the number of call center agents supported by the main switch and an input text box 514 in which the user can provide information regarding the type of call center agents. For example, agents might be on digital, analog, IP LAN, or IP WAN telephones.

The interface 500 also may include an input text box 516 in which a user of the interface 500 can provide or enter information regarding percentage ACD (automatic call distributor) to be used. Call centers typically have more incoming calls than there are agents. Callers may be held in queues requiring additional DID trunks, which is equivalent to DID overtrunking. Thus, the information in the box 516 indicates how the percentage DID overtrunking for ACD agents are needed.

On the output side of the interface 500, the interface 500 may include an output box 520 that provides information regarding the number of digital line cards are required in or for the main switch, an output text box 522 that provides information regarding how many analog line cards are required in or for the main switch, and an output box 524 that provides information regarding the number of IP line cards required in or for the main switch. Assumptions may be built into the interface regarding the models of line cards to be used and the capabilities of each type of line card. The values for the output boxes 520, 522 and 524 can be determined by dividing the number of users for each type by the number of lines that each type of card can support. Output boxes for the interface 500 may be used in or as part of implementing the step 158.

Also on the output side of the interface 500, the interface 500 may include an output box 530 that provides information regarding the number of digital line cards are required in or for each access point at the location "1", an output text box 532 that provides information regarding how many analog line cards are required in or for each access point at the location "1", and an output box 534 that provides information regarding the number of IP line cards required in or for each access point in the location "1". Assumptions may be built into the interface regarding the models of line cards to be used and the capabilities of each type of line card. The values for the output boxes 530, 532 and 534 can be determined by summing up the respective line cards for all access points that have been calculated earlier.

Now referring to FIG. 8, another representative interface 600 is illustrated that may be used to obtain or otherwise determine information or data in or as part of the step 152. The interface 600 is particularly well suited for situations in which detailed information is available and a thorough design and optimization is required. Using the interface 500, an engineer can enter customer provided information and adjust any of the traffic determining parameters. The interface 600 includes the input boxes 402, 404, 406, 410, 412, 414, 416, 418, 420, 422, 424, 510, 512, 514, and 516, along with the "Calculate" button 430, previously discussed above. While not shown in FIG. 8, the interface 600 also may include the input text boxes 426 and 428 previously discussed above.

In addition to the input boxes, the interface 500 includes the output boxes 450, 452, 454, 456, 458, 460, 520, 522, 524, 470, 472, 474, 476, 478, 480, 520, 523, 524, 530, 532, and 534 previously discussed above. While not shown in FIG. 8, the interface 600 also may include the output text boxes 462, 464, 482 and 484 previously discussed above.

The interface 600 also may include input text boxes 602, 604, 606, 608, 610, 612, 614, 616, 618, 620, 622, 624, 626, and 628 wherein a user can enter or provide system level parameters and information. For example, the user may enter or provide the percentage of blocking for the system into the text block 602, which represents the accepted percentage of calls that will not be able to seize a trunk during busy hour traffic. The user may enter or provide information in the text box 604 regarding the percentage of incoming trunk calls in the system and information in the text box 606 regarding the percentage of outgoing trunk calls in the system. The total of the percentages in the text boxes 604 and 606 should be equal to one hundred percent.

A user of the interface 600 may enter or provide information into the text box 608 regarding the number of phantom lines in the system. A phantom line is an extension line that is added to the system for design purposes, but that never receives for an actual call. A phantom line may be used to redirect calls within the system under special circumstances.

A user of the interface 600 may enter or provide information into the text box 610 regarding the traffic value for each digital user in the system that is used in designing the system. While not shown in FIG. 8, the interface 600 also may include a text box wherein a user may enter or provide information regarding the traffic value for each analog user in the system that is used in designing the system. A user of the interface 600 may enter or provide information into the text box 612 regarding the traffic value for each IP user in the system that is used in designing the system.

A user of the interface 600 may enter or provide information into the text box 614 regarding the traffic value in CCS for each ACD agent in the system that is used to design the system. The user may enter or provide information in the text box 616 regarding the traffic value in CCS for voicemail per subscriber that is used to design the system.

The interface 600 may include the text box 618 in which a user may enter or provide information regarding the encoding (e.g., G.711 or G729A) for any IP LAN in the system (e.g., the networks 127, 134). In the text box 620, the user may provide or enter information regarding the number of PCM (Pulse Code Modulation) samples that are embedded into an RTP (real time protocol) packet. Typically, the higher the sampling time the more efficient is the IP packetization while the introduced delay is increased.

The interface may include the text box 622 in which a user may enter or provide information regarding the size of a jitter buffer for any IP LAN in the system, which is compensating for the changing propagation time of packets through the network. Jitter refers to the variance in the arrival rate of IP packets and may be caused by, for example, cueing on the network. The size of the jitter buffer may be driven by two conflicting goals: (1) minimizing packetization delay; and (2) preventing buffer underflow caused by network jitter.

The interface 600 may include the text box 624 in which a user may enter or provide information regarding the encoding (e.g., G.711 or G729A) for an IP WAN in the system (e.g., the network 132). In the text box 626, the user may provide or enter information regarding the number of PCM samples that are embedded into an RTP packet for the IP WAN. Typically, the higher the sampling time the more efficient is the IP packetization while the introduced delay is increased. The interface may include the text box 628 in which a user may enter or provide information regarding the size of a jitter buffer for the IP WAN.

In addition to the system parameters discussed above for the interface 600, the interface 600 may include input text box 630 in which a user can enter or provide information regarding the percentage of incoming trunk traffic that is handled by local trunks at the given location. Similarly, the interface 600 may include input text box 632 in which a user can enter or provide information regarding the percentage of outgoing trunk traffic that is handled by local trunks at the given location.

The interface 600 also may include an input text box 634 in which a user can enter or provide information regarding the encoding (e.g., G.711, G729A) of the data stream for the access points. The user may enter information into an input text box 636 regarding the sampling time used in the encoding on the IP access points, which determines the number of PCM samples that are embedded into an RTP packet for a given access point.

While not shown in FIG. 8, the interface 600 also may include an input text box that allows a user of the interface 600 to enter information regarding the community of interest factor for both the main switch and the access points at locations. As previously discussed above, a community of interest factor specifies how homogenous the call distribution is within a system. Typically, users are more likely to call someone at their own location rather than someone at another location. A community of interest factor of zero percent for a location means that all calls generated by the location stay within the location. No traffic is generated to the other locations by calls originating at the first location. A community of interest factor of one hundred percent means that the calls generated by the first location are distributed homogenously and are not weighted by location.

Also while not shown in FIG. 8, the interface 600 may include an input text box that allows a user of the interface 600 to enter information regarding the percentage of calls into a public network (e.g., the network 144) in relation to the total number of calls generated by or within a location. Trunk call percentage often is approximately sixty-eight percent.

On the output side of the interface 600, the interface 600 may include an output box 650 that provides information regarding the number of incoming trunk channels on a second trunk type needed for the main switch 128, as based on the information provided in the boxes 418 and is similar to the box 454 for the first trunk type. Similarly, the output text box 652 provides information regarding the number of outgoing trunk channels needed on the main switch 128 for a second trunk type and is similar to the box 456 for the first trunk type. Output boxes in or for the interface 600 may be used in or as part of implementing the step 158.

The interface 600 may include an output box 658 in which information regarding the one-way delay between two IP users at the location connected to the access point via a LAN (e.g., the networks 127, 134) is provided, such delay excluding networking delay. The LAN delay between the two IP users may depend on the encoding, sampling time, and jitter buffer times for the network established in the input boxes 618, 620, 622, respectively, and is calculated by adding up the individual delays.

The interface 600 may include an output box 660 that may provide information regarding the IP overhead percentage for IP users on the LAN network (e.g., the network 127) is added to each Ethernet payload packet as a result of encoding, RTP overhead, and sampling time for the network established in 618, 620 and 622. The IP LAN overhead percentage is calculated by dividing the overhead by the total packet size.

The interface 600 may include an output box 662 that may provide information regarding one-way delay between two IP users connected to the access point via a WAN (e.g., the network 132), such delay excluding networking delay. The WAN delay between the two IP users may depend on the encoding, sampling time, and jitter buffer times for the wide area network established in the input boxes 624, 626, 628, respectively, and is calculated by adding up the individual delays.

The interface 600 may include an output box 664 that may provide information regarding the IP WAN overhead percentage for the WAN network used by two IP users to communicate with an access point that is added to each Ethernet payload packet as a result of encoding, RTCP overhead, and sampling time for the WAN established in boxes 624, 626 and 628. The IP WAN overhead percentage is calculated by dividing the overhead by the total packet size.

The interface 600 may include an output box 670 that provides information regarding the number of incoming trunk channels on a second trunk type needed for the access point, as based on the information provided in the boxes 418 and is similar to the box 474 for the first trunk type. Similarly, the output text box 672 provides information regarding the number of outgoing trunk channels needed on the access point for a second trunk type and is similar to the box 476 for the first trunk type for the access point.

The interface 600 may include an output box 674 that indicates whether local trunks are used for survivability only and thus are not included in the trunk calculation for that location.

The interface 600 may include an output box 678 that may provide information regarding the delay between the main switch 128 and a specific access point at location "1". The delay depends on the jitter buffer, encoding, and sampling times established in boxes 634 and 636 and is calculated by adding up the individual delays.

The interface 600 may include an output box 680 that may provide information regarding specific IP overhead for each Ethernet packet that is exchanged between the main switch 128 and a specific location or an access point at the specific location. The IP overhead depends on the encoding and sampling time established in boxes 634 and 636 and is calculated by dividing the overhead by the total packet size.

The interface 600 may include an output box 682 that may provide information regarding payload bandwidth per voice connection. The payload bandwidth depends on the encoding and sampling time established in boxes 634 and 636 and is calculated by adding the required voice bandwidth and the IP overhead.

Figure 9:
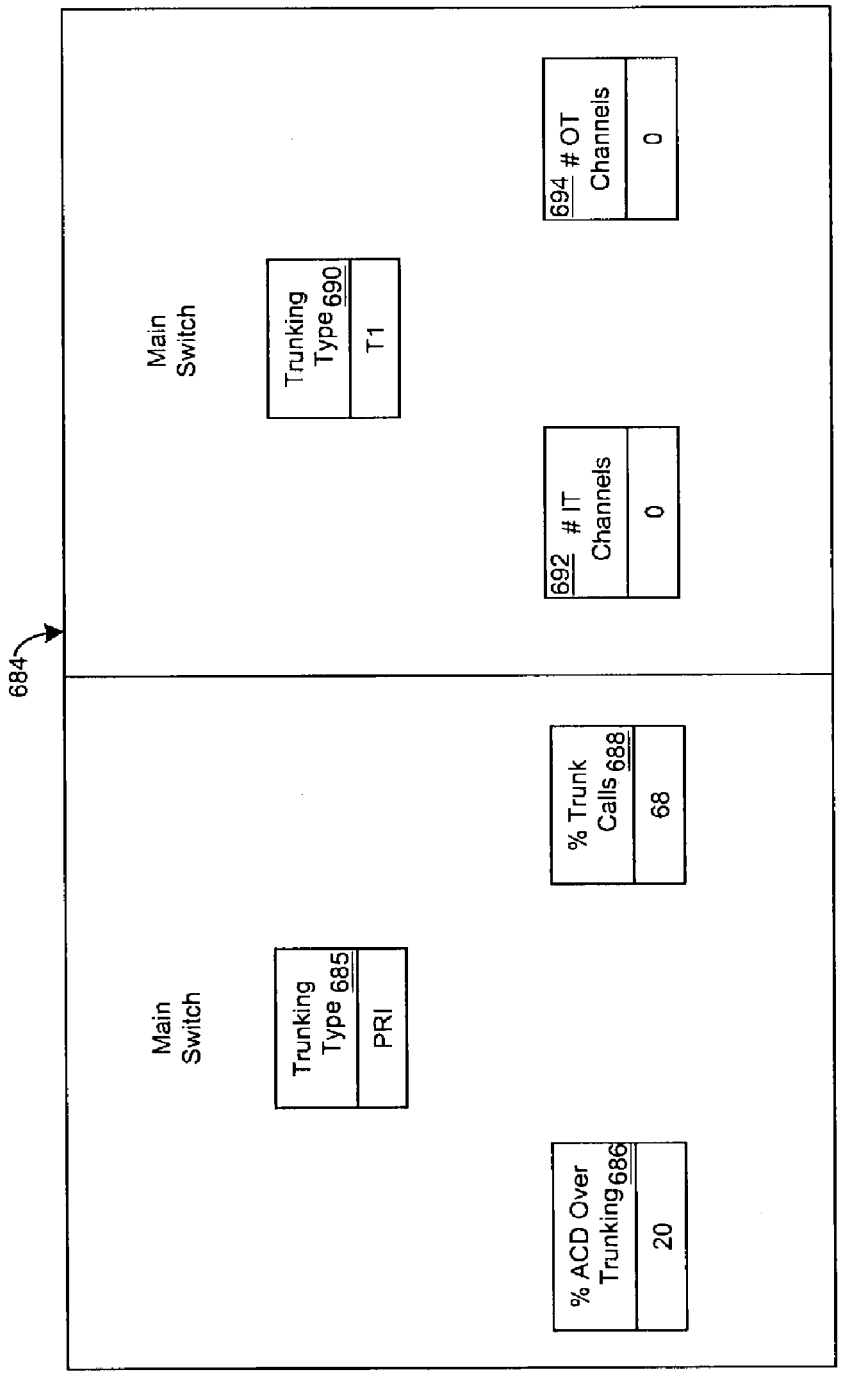
FIG. 9 is a diagram of an interface that may be used to gather information regarding trunking needs for a main switch.

As previously discussed above, in some embodiments of the interface 600, multiple trunk types may be allow at the main switch 128 and/or one or more locations. For example, when a user attempts to enter or select a type of trunk for the main switch 128 using the text box 418, a pop up window or interface 684 may appear as illustrated in FIG. 9. The window 684 may include a text box 685 in which the user can enter or select a first type (e.g., PRI, analog, T1) of trunking for the main switch 128, a text box 686 in which the user can enter a percentage of ACD over trunking needed for the trunk type, and a text box 688 in which the user can enter a percentage trunk calls that is indicative of percentage of trunk calls out of the total volume of calls. If the user wants or needs to specify a second trunk type for the main switch 128, the user can enter such a designation into box 690, the number of input trunks for the second trunk type into box 692, and the number of output trunks for the second trunk type into box 694. If entries into the boxes 692 and 694 are both zero, then it may be assumed that a second trunk type does not exist or is not needed. If more than two trunk types are specified for the main switch 128 using the window 684, output values may be generated for the output boxes 454, 456, 650, 652.

While the window 684 has been illustrated for use in identifying one or more trunks for the main switch 128, a similar window may be used for identifying one or more trunks for each location. For example, when a user attempts to enter or select a type of trunk for a location using the text box 418, a pop up window or interface similar to the window 684 may appear. If more than two trunk types are specified for the location using the window, output values may be generated for the output boxes 474, 476, 670, 672.

Device

Figure 10:
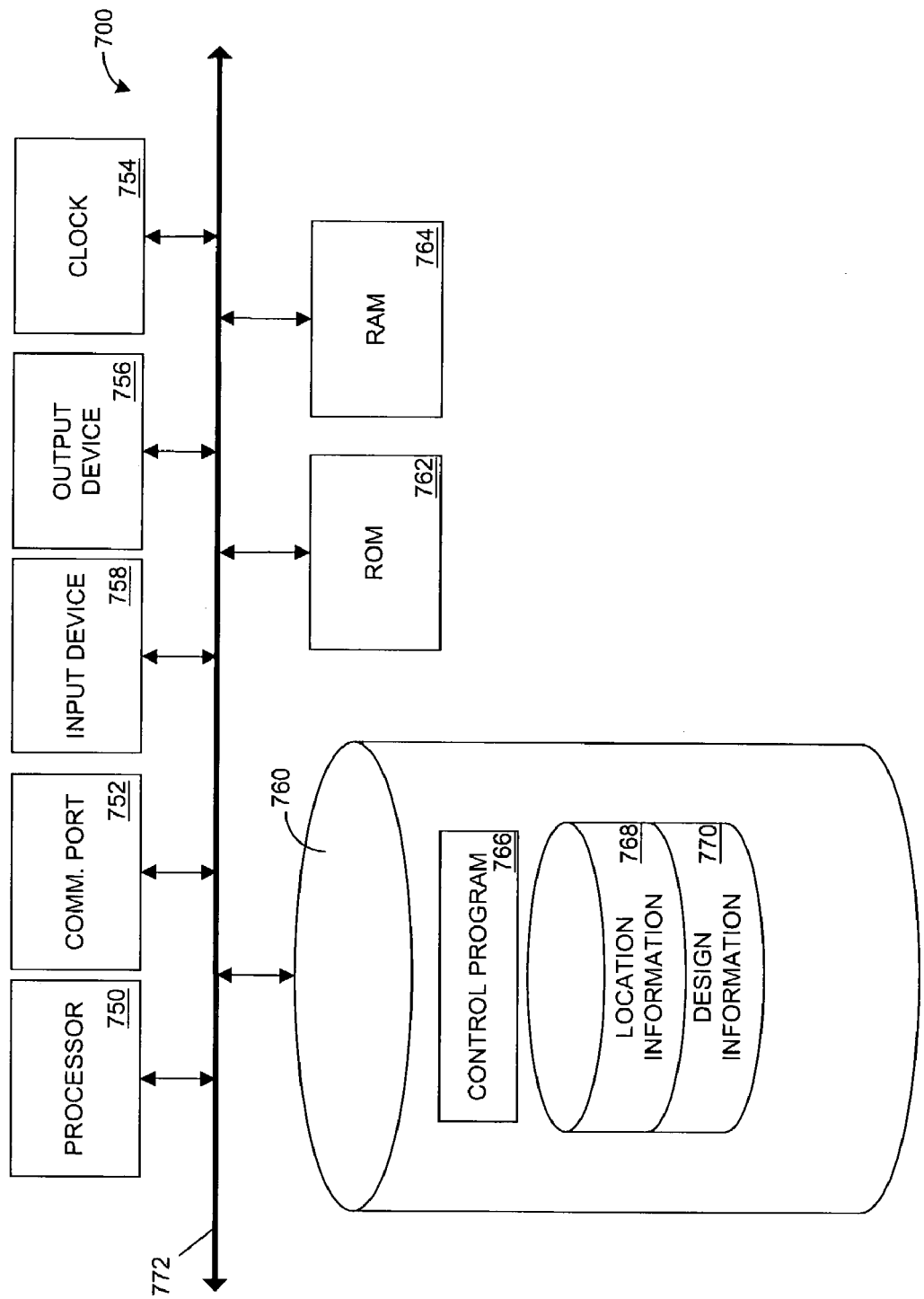
FIG. 10 is a block diagram of components that can be included in a device that implements the interfaces of FIGS. 6-8 and/or implements the methods of FIGS. 4 or 5.

Now referring to FIG. 10, a representative block diagram of a server, computer or other device 700 is illustrated that may implement the methods of the present invention, display the interfaces described herein, etc. In some embodiments, the device 700 may implement or host a Web site and/or may be or include a single device or computer, a networked set or group of devices or computers, a mainframe or host computer, a workstation, etc.

The device 700 may include a processor, microchip, central processing unit, or computer 750 that is in communication with or otherwise uses or includes one or more communication ports 752 for communicating with user devices. Communication ports may include such things as local area network adapters, wireless communication devices, Bluetooth technology, etc. The device 700 also may include an internal clock element 754 to maintain an accurate time and date for the device 700, create time stamps for communications received or sent by the device 700, etc.

If desired, the device 700 may include one or more output devices 756 such as a printer, infrared or other transmitter, antenna, audio speaker, display screen or monitor, text to speech converter, etc., as well as one or more input devices 758 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 700 may include a memory or data storage device 760 to store information, software, databases, communications, device drivers, inventory data, system data, etc. The memory or data storage device 760 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The device 700 also may include separate ROM 762 and RAM 764.

The processor 750 and the data storage device 760 in the device 700 each may be, for example: (i) located entirely within a single computer or other computing device; or (ii) connected to each other by a remote communication medium, such as a serial port cable, telephone line or radio frequency transceiver. In one embodiment, the device 700 may comprise one or more computers that are connected to a remote server computer for maintaining databases.

In some embodiments, a conventional mainframe, personal computer, server, or workstation with sufficient memory and processing capability may be used as the device 700. In some embodiments, the device 700 operates as or includes a Web server for an Internet environment and may implement an interface as previously described above. The device 700 preferably is capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 750. Equivalent or other processors are available from Motorola, Inc., AMD, or Sun Microsystems, Inc. The processor 750 also may comprise one or more microprocessors, computers, computer systems, etc.

Software may be resident and operating or operational on the device 700. The software may be stored on the data storage device 760 and may include a control program 766 for operating the server, databases, etc. The control program 766 may control the processor 750. The processor 750 preferably performs instructions of the control program 766, and thereby operates in accordance with the present invention, and particularly in accordance with the methods described in detail herein. The control program 766 may be stored in a compressed, uncompiled and/or encrypted format. The control program 766 furthermore includes program elements that may be necessary, such as an operating system, a database management system and device drivers for allowing the processor 750 to interface with peripheral devices, databases, etc. Appropriate program elements are known to those skilled in the art, and need not be described in detail herein.

The device 700 also may include or store information regarding users, lines, inventory or configuration information, access point information, location information, communications, etc. For example, information regarding one or more locations may be stored in a location information database 768 for use by the device 700 or another device or entity. Information regarding one or more system designs or configurations may be stored in a design information database 770 for use by the device 700 or another device or entity. In some embodiments, some or all of one or more of the databases may be stored or mirrored remotely from the device 700.

According to an embodiment of the present invention, the instructions of the control program may be read into a main memory from another computer-readable medium, such as from the ROM 762 to the RAM 764. Execution of sequences of the instructions in the control program causes the processor 750 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 750, communication port 752, clock 754, output device 756, input device 758, data storage device 760, ROM 762, and RAM 764 may communicate or be connected directly or indirectly in a variety of ways. For example, the processor 750, communication port 752, clock 754, output device 756, input device 758, data storage device 760, ROM 762, and RAM 764 may be connected via a bus 772.

While a specific implementations and hardware/software configuration for the device 700 has been illustrated, it should be noted that other implementations and hardware/software configurations are possible and that no specific implementation or hardware/software configuration is needed.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for determining the number of users for an access point, comprising:
   determining inventory information for a location having a known number of users, where the access point is to be treated as an individual switch with a limited number of connections to a network, the number of required access points for the location is unknown, and the number of users per access point is unknown;
   establishing a number of users for an access point and a user type for said location to an initial value, wherein said initial value does not exceed the maximum number of users supportable by the access point;
   calculating traffic parameters for the access point based on the established number of users and the inventory information, the traffic parameters including:
   traffic from the access point to all other locations;
   traffic to the access point from all other locations;
   traffic from the access point to other access points at the location;
   traffic to the access point from other access points at the location;
   voice mail traffic and use; and
   community of interest factors for the location;
   determining a number of channels required for said access point based on said calculated traffic parameters; and
   changing said number of users for said access point and repeating the calculating and the determining of the number of channels required for said access point until such time as a highest number of users is established for said access point while said access point's channel capacity is not exceeded.

2. The method of claim 1, wherein said inventory information includes at least one of the following:
   information regarding a number of users at said location;
   information regarding types of users at said location;
   information regarding other locations;
   information regarding traffic for said location;
   information regarding voice mail needs for users at said location;
   information regarding a community of interest factor for said location; and
   information regarding trunking needs for said location.

3. The method of claim 1, wherein said changing said number of users includes increasing said number of users if said access point's channel capacity is not exceeded.

4. The method of claim 3, wherein said changing said number of users includes decreasing said number of users for said access point if said access point's channel capacity is exceeded.

5. The method of claim 3, wherein said changing said number of users includes increasing said number of users for said access point by an amount equal to a number of users supportable by a line card in said access point.

6. The method of claim 1, further comprising:
   determining a number of channels needed for a main switch, said main switch being in communication with said access point.

7. The method of claim 1, further comprising:
   determining a number of access points needed for said location.

8. The method of claim 1, wherein said determining inventory information for a location includes providing an interface, wherein said interface is adapted to receive data indicative of said inventory information.

9. The method of claim 8, wherein said interface is adapted to provide data indicative of a number of access points needed for said location.

10. The method of claim 8, wherein said interface is adapted to provide data indicative of said highest number of users for said access point.

11. The method of claim 10, wherein said interface is adapted to provide data indicative of a number of channels established for said access point.

12. The method of claim 1, wherein said establishing a number of users for an access point for said location to an initial value includes establishing a number of users of a single user type for said access point to said initial value.

13. The method of claim 12, wherein said determining a number of channels required for said access point based on said number of users and said inventory information includes determining a number of channels required for said access point based on said number of users, said inventory information, and said single user type.

14. The method of claim 13, wherein said changing said number of users and repeating (c) until such time as a highest number of users is established for said access point while said access point's channel capacity is not exceeded includes changing said number users for said single user type for said access point.

* * * * *